United States Patent
Zhang et al.

(10) Patent No.: US 11,109,433 B2
(45) Date of Patent: Aug. 31, 2021

(54) METHOD, APPARATUS, AND MEDIUM FOR CONFIGURING A FIRST SUBFRAME SET

(71) Applicant: Huawei Technologies Co., Ltd., Shenzhen (CN)

(72) Inventors: Lili Zhang, Beijing (CN); Richard Stirling-Gallacher, Munich (DE); Yongbo Zeng, Beijing (CN); Bin Liu, San Diego, CA (US); Kai Xu, Shenzhen (CN); Xiaocui Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 16/308,264

(22) PCT Filed: Jun. 8, 2016

(86) PCT No.: PCT/CN2016/085366
§ 371 (c)(1),
(2) Date: Dec. 7, 2018

(87) PCT Pub. No.: WO2017/210909
PCT Pub. Date: Dec. 14, 2017

(65) Prior Publication Data
US 2019/0268957 A1 Aug. 29, 2019

(51) Int. Cl.
H04W 76/15 (2018.01)
H04W 72/04 (2009.01)
(Continued)

(52) U.S. Cl.
CPC .......... *H04W 76/15* (2018.02); *H04L 5/0007* (2013.01); *H04W 28/0215* (2013.01);
(Continued)

(58) Field of Classification Search
CPC . H04W 76/15; H04W 72/04; H04W 28/0215; H04W 28/18; H04W 72/0413;
(Continued)

(56) References Cited

U.S. PATENT DOCUMENTS 9,083,497 B2 * 7/2015 Lee .................. H04L 5/0053
2011/0280205 A1 11/2011 Qin et al.
(Continued)

FOREIGN PATENT DOCUMENTS

CN 101772176 A 7/2010
CN 103313402 A 9/2013
(Continued)

Primary Examiner — Omar J Ghowrwal
(74) Attorney, Agent, or Firm — Slater Matsil, LLP

(57) ABSTRACT

An interference coordination method includes: determining, by a first cell, first configuration information of the first cell. The first configuration information includes a parameter for transmitting uplink control information UCI by a terminal served by the first cell, the parameter included in the first configuration information is a parameter configured for the first cell and is a parameter orthogonal to a parameter configured for a second cell, and the second cell is a neighboring cell of the first cell; and notifying, by the first cell, the first configuration information to the served terminal.

20 Claims, 6 Drawing Sheets

---

S401

A first cell configures a first subframe set for a first uplink control channel

S402

The first cell notifies subframe configuration information to a terminal served by the first cell, where the subframe configuration information includes at least one of the following: the first subframe set, a subset of the first subframe set, a complementary set of the first subframe set, and a subset of the complementary set of the first subframe set, and a subframe included in the subframe configuration information is used by the served terminal to transmit an uplink sounding reference signal

(51) Int. Cl.
  *H04L 5/00* (2006.01)
  *H04W 28/02* (2009.01)
  *H04W 28/18* (2009.01)
(52) U.S. Cl.
  CPC .......... *H04W 28/18* (2013.01); *H04W 72/04* (2013.01); *H04W 72/0413* (2013.01); *H04W 72/0446* (2013.01); *Y02D 30/70* (2020.08)
(58) Field of Classification Search
  CPC ... H04W 72/0446; H04L 5/0007; Y02D 30/70
  See application file for complete search history.

(56) References Cited

U.S. PATENT DOCUMENTS

| | | | |
|---|---|---|---|
| 2012/0220327 A1* | 8/2012 | Lee | H04W 72/1273 455/509 |
| 2014/0313948 A1 | 10/2014 | Jänis et al. | |
| 2015/0029988 A1 | 1/2015 | Chai et al. | |
| 2015/0208366 A1* | 7/2015 | Papasakellariou | H04W 52/34 370/311 |
| 2015/0318904 A1 | 11/2015 | Lee et al. | |
| 2016/0113007 A1 | 4/2016 | Centonza et al. | |
| 2016/0165545 A1* | 6/2016 | Ouchi | H04W 52/228 455/522 |
| 2016/0165547 A1* | 6/2016 | Ouchi | H04W 52/146 455/522 |
| 2016/0173236 A1* | 6/2016 | Cheng | H04L 1/1854 370/281 |
| 2017/0005770 A1* | 1/2017 | Shimezawa | H04L 5/0057 |
| 2017/0034808 A1* | 2/2017 | Ouchi | H04W 52/226 |
| 2017/0264402 A1* | 9/2017 | Papasakellariou | H04W 52/58 |
| 2018/0069675 A1* | 3/2018 | Chang | H04L 1/00 |
| 2018/0269934 A1* | 9/2018 | Kim | H04W 72/0413 |
| 2019/0116602 A1* | 4/2019 | Zhang | H04L 5/0073 |
| 2019/0191381 A1* | 6/2019 | Zhang | H04W 72/044 |

FOREIGN PATENT DOCUMENTS

| | | |
|---|---|---|
| CN | 103391552 A | 11/2013 |
| CN | 105432033 A | 3/2016 |
| EP | 2413650 A1 | 1/2012 |
| EP | 2537282 B1 | 12/2012 |
| WO | 2012119636 A1 | 9/2012 |
| WO | 2014047946 A1 | 4/2014 |
| WO | 2014172528 A1 | 10/2014 |
| WO | 2016036158 A1 | 3/2016 |

\* cited by examiner

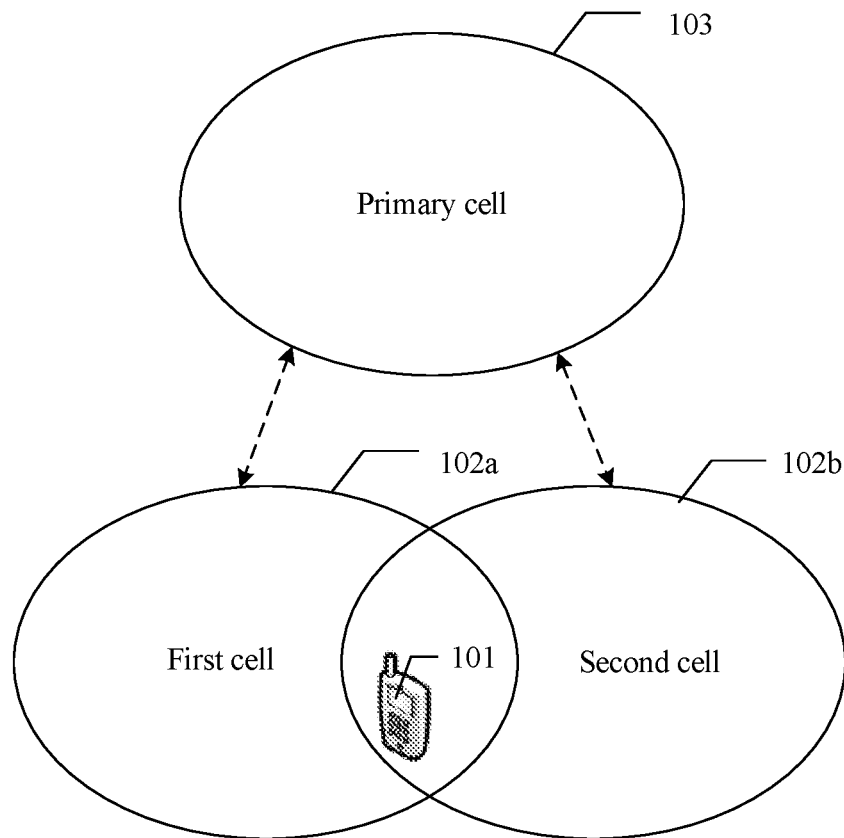

A first cell determines first configuration information of the first cell, where the first configuration information includes a parameter for transmitting UCI by a terminal served by the first cell, the parameter included in the first configuration information is a parameter configured for the first cell and is a parameter orthogonal to a parameter configured for a second cell, and the second cell is a neighboring cell of the first cell

S202

The first cell notifies the first configuration information to the served terminal

FIG. 2

METHOD, APPARATUS, AND MEDIUM FOR CONFIGURING A FIRST SUBFRAME SET

CROSS-REFERENCE TO RELATED APPLICATIONS

This application is a national stage of International Application No. PCT/CN2016/085366, filed on Jun. 8, 2016, which is hereby incorporated by reference in its entirety.

TECHNICAL FIELD

This application relates to the field of communications technologies, and in particular, to an interference coordination method and apparatus.

BACKGROUND

With booming of intelligent terminals and multitudinous services, a future network presents various forms such as dense deployment, diversified services, and coexistence of heterogeneous networks. In an ultra dense network (UDN for short), small cells are deployed relatively densely, and transmit power of user equipment (UE for short) is increasingly approximate to transmit power of a small cell. Therefore, in the UDN, interference between neighboring cells is severe, and the UE also causes interference to the small cell.

For the interference between neighboring cells, enhanced inter-cell interference coordination (eICIC) may be used to enhance throughputs of a system and a cell edge. When eICIC is used, a macro cell uses an almost blank subframe (ABS for short) to protect resources that are subject to strong cell interference, where the ABS subframe means reducing transmit power or not performing transmission in some physical channels.

When the UE is located in an overlapping area between two small cells, there is no implementation for ensuring that interference between UEs is avoided during uplink transmission.

SUMMARY

Embodiments of this application provide an interference coordination method and apparatus to reduce interference in uplink transmission.

According to a first aspect, an embodiment of this application provides an interference coordination method, where the method includes: determining, by a first cell, first configuration information of the first cell, where the first configuration information includes a parameter for transmitting uplink control information UCI by a terminal served by the first cell, the parameter included in the first configuration information is a parameter configured for the first cell and is a parameter orthogonal to a parameter configured for a second cell, and the second cell is a neighboring cell of the first cell; and notifying, by the first cell, the first configuration information to the served terminal.

The served terminal is a terminal that is served by the first cell and on which an absolute value of a difference between signal strength received from the first cell and signal strength received from the second cell is less than a preset threshold.

When the served terminal is located in an overlapping area between the first cell and the second cell, the first configuration information is determined for the served terminal, so that when the served terminal transmits the UCI by using a resource indicated by the parameter included in the first configuration information, it is ensured that no interference is caused to other terminals that are located in an area of the second cell and access the second cell and terminals that are located in an area of the first cell and access the first cell during uplink transmission in the second cell and uplink transmission in the first cell. In addition, for a terminal that is not located in the overlapping area and accesses the first cell, a resource configured in the prior art may be used to transmit UCI.

In a possible design, the parameter included in the first configuration information is configured for the served terminal. Specifically, when the terminal accesses the first cell and the terminal is located in the overlapping area between the first cell and the second cell, the first cell may allocate the parameter to the terminal, and deliver the parameter to the terminal, so that the terminal can transmit the UCI by using the resource indicated by the parameter.

In a possible design, the parameter included in the first configuration information includes at least one of a cyclic shift value and an orthogonal sequence code.

In a possible design, the determining, by a first cell, first configuration information of the first cell may be implemented in the following manner: selecting, by the first cell, a parameter from a first parameter pool, and generating the first configuration information, where the first parameter pool includes a plurality of parameters preconfigured for the first cell and used for transmitting the UCI by the terminal served by the first cell, and any two parameters are orthogonal to each other.

The first parameter pool may include a plurality of sequence codes and a plurality of cyclic shift values.

Any two sequence codes included in the first parameter pool are orthogonal to each other, or any two cyclic shift values included in the first parameter pool are orthogonal to each other.

In a possible design, the parameters included in the first parameter pool are orthogonal to parameters included in a second parameter pool preconfigured for the second cell.

In a possible design, before the determining, by a first cell, first configuration information of the first cell, the method may further include: receiving, by the first cell, second configuration information of the second cell notified by the second cell, where the second configuration information includes a parameter preconfigured for the second cell and used for transmitting UCI by a terminal served by the second cell.

Based on the foregoing design, the determining, by a first cell, first configuration information of the first cell may be implemented in the following manner: determining, by the first cell, the first configuration information of the first cell based on the second configuration information of the second cell, where the parameter in the first configuration information is orthogonal to the parameter in the second configuration information.

In a possible design, the notifying, by the first cell, the first configuration information to the served terminal may be implemented in the following manner: sending, by the first cell, the first configuration information to the served terminal by using radio resource control RRC signaling.

In a possible design, the first cell is a secondary cell of the served terminal, and the served terminal is further connected to a primary cell; and the notifying, by the first cell, the first configuration information to the served terminal may be implemented in the following manner: instructing, by the first cell, the primary cell to send the first configuration information to the served terminal.

In a possible design, the first cell is the secondary cell of the served terminal, the served terminal is further connected to the primary cell, and before the determining, by a first cell, first configuration information of the first cell, the method further includes: notifying, by the first cell, third configuration information preconfigured for the first cell to the primary cell, so that the primary cell selects, from at least one UCI parameter included in the third configuration information, a parameter that is orthogonal to a parameter included in received fourth configuration information sent by the second cell, and after generating the first configuration information, sends the first configuration information to the first cell; where the third configuration information includes at least one parameter used for transmitting the UCI by the terminal served by the first cell, and the fourth configuration information includes at least one parameter preconfigured for the second cell and used for transmitting UCI by a terminal served by the second cell.

In a possible design, the first cell is the secondary cell of the served terminal, the served terminal is further connected to the primary cell, and before the determining, by a first cell, first configuration information of the first cell, the method further includes: notifying, by the first cell, third configuration information preconfigured for the first cell to the primary cell, so that the primary cell reallocates at least one parameter to the first cell and the second cell separately based on the third configuration information and received fourth configuration information sent by the second cell; where the at least one parameter allocated to the first cell is orthogonal to the at least one parameter allocated to the second cell, the third configuration information includes at least one parameter used for transmitting the UCI by the terminal served by the first cell, and the fourth configuration information includes at least one parameter preconfigured for the second cell and used for transmitting UCI by a terminal served by the second cell.

Based on the foregoing design, the determining, by a first cell, first configuration information of the first cell may be implemented in the following manner: receiving, by the first cell, the at least one parameter allocated to the first cell and sent by the primary cell; and selecting, by the first cell, a parameter from the at least one parameter allocated to the first cell, and generating the first configuration information.

In a possible design, the first cell is the secondary cell of the served terminal, the served terminal is further connected to the primary cell, and before the determining, by a first cell, first configuration information of the first cell, the method further includes: notifying, by the first cell, third configuration information preconfigured for the first cell to the primary cell, so that the primary cell determines, based on the third configuration information and received fourth configuration information sent by the second cell, a first configuration mode for optimizing the third configuration information by the first cell and a second configuration mode for optimizing the fourth configuration information by the second cell; where at least one parameter included in the third configuration information optimized by the first cell based on the first configuration mode is orthogonal to at least one parameter included in the fourth configuration information optimized by the second cell based on the second configuration mode, the third configuration information includes at least one parameter used for transmitting the UCI by the terminal served by the first cell, and the fourth configuration information includes at least one parameter preconfigured for the second cell and used for transmitting UCI by a terminal served by the second cell.

Based on the foregoing design, the determining, by a first cell, first configuration information of the first cell may be implemented in the following manner: receiving, by the first cell, the first configuration mode sent by the primary cell; and optimizing, by the first cell, the third configuration information based on the first configuration mode, and selecting a parameter from the at least one parameter included in the optimized third configuration information to generate the first configuration information.

According to a second aspect, an embodiment of this application further provides an interference coordination method, where the method includes: determining, by a primary cell, first configuration information of a secondary cell, where a terminal of dual connectivity is connected to the primary cell and the secondary cell separately, and a parameter included in the first configuration information is a parameter allocated to the secondary cell and is a parameter orthogonal to a parameter allocated to a neighboring cell of the secondary cell; and notifying, by the primary cell, the first configuration information to the terminal of dual connectivity.

In the manner provided by this embodiment of this application, the primary cell determines, for the secondary cell, the parameter used for transmitting UCI by the terminal of dual connectivity, and the parameter corresponding to the secondary cell is orthogonal to the parameter of the neighboring cell of the secondary cell, thereby ensuring that no interference is caused to the neighboring cell when a terminal served by the secondary cell transmits UCI.

In a possible design, the parameter included in the first configuration information is used for transmitting uplink control information UCI by the terminal of dual connectivity.

In a possible design, the terminal of dual connectivity is located in an overlapping area between the secondary cell and the neighboring cell of the secondary cell.

In a possible design, the first configuration information includes at least one of a cyclic shift value and an orthogonal sequence code.

In a possible design, the first configuration information is configured for the terminal of dual connectivity.

In a possible design, before the determining, by a primary cell, first configuration information of a secondary cell, the method may further include: receiving, by the primary cell, second configuration information sent by the secondary cell, and receiving third configuration information sent by the neighboring cell, where the second configuration information includes at least one parameter used for transmitting UCI by a terminal served by the secondary cell, and the third configuration information includes at least one parameter used for transmitting UCI by a terminal served by the neighboring cell.

Therefore, the determining, by a primary cell, first configuration information of a secondary cell may be implemented in the following manner: determining, by the primary cell, the first configuration information based on the second configuration information and the third configuration information.

The determining, by the primary cell, the first configuration information based on the second configuration information and the third configuration information may be implemented in the following manner: selecting, by the primary cell from the at least one parameter included in the second configuration information, a parameter that is orthogonal to a parameter included in the third configuration information, and generating the first configuration information.

In a possible design, after the receiving, by the primary cell, second configuration information sent by the secondary cell, and receiving third configuration information sent by the neighboring cell, and before the determining, by a primary cell, first configuration information of the secondary cell, the method may further include: allocating, by the primary cell, at least one parameter to the secondary cell and the neighboring cell separately based on the second configuration information and the third configuration information, and notifying the secondary cell and the neighboring cell, where the at least one parameter allocated to the secondary cell is orthogonal to the at least one parameter allocated to the neighboring cell.

Based on the foregoing design, the determining, by a primary cell, first configuration information of the secondary cell may be implemented in the following manner: receiving, by the primary cell, the first configuration information sent by the secondary cell, where the first configuration information is generated based on a parameter that is selected from the at least one UCI parameter allocated to the secondary cell and used for sending the UCI by the terminal of dual connectivity after the secondary cell receives the at least one parameter allocated to the secondary cell and sent by the primary cell.

In a possible design, after the receiving, by the primary cell, second configuration information sent by the secondary cell, and receiving third configuration information sent by the neighboring cell, and before the determining, by a primary cell, first configuration information of the secondary cell, the method may further include: determining, by the primary cell based on the second configuration information and the third configuration information, a first configuration mode for optimizing the second configuration information by the secondary cell and a second configuration mode for optimizing the third configuration information by the neighboring cell, and sending the first configuration mode to the secondary cell and sending the second configuration mode to the neighboring cell; where at least one parameter included in the second configuration information optimized by the secondary cell based on the first configuration mode is orthogonal to at least one parameter included in the third configuration information optimized by the neighboring cell based on the second configuration mode.

Based on the foregoing design, the determining, by a primary cell, first configuration information of the secondary cell may be implemented in the following manner: receiving, by the primary cell, the first configuration information sent by the secondary cell, where the first configuration information is generated based on a parameter that is selected from the at least one parameter included in the optimized second configuration information and used for transmitting the UCI by the terminal of dual connectivity after the secondary cell optimizes the second configuration information based on the first configuration mode.

In a possible design, the notifying, by the primary cell, the first configuration information to the terminal of dual connectivity includes: sending, by the primary cell, the first configuration information to the terminal of dual connectivity by using RRC signaling.

In a possible design, the notifying, by the primary cell, the first configuration information to the terminal of dual connectivity includes: sending, by the primary cell, a notification message to the terminal of dual connectivity, where the notification message is used to instruct the terminal of dual connectivity to obtain the first configuration information from the secondary cell.

According to a third aspect, an embodiment of this application provides an interference coordination method, where the method includes: configuring, by a first cell, a first subframe set for first uplink information; and notifying, by the first cell, subframe configuration information to a terminal served by the first cell, where the subframe configuration information includes at least one of the following: the first subframe set, a subset of the first subframe set, a complementary set of the first subframe set, and a subset of the complementary set of the first subframe set, and a subframe included in the subframe configuration information is used by the served terminal to transmit an uplink signal.

When transmitting the uplink signal, the terminal served by the first cell is prevented from using a subframe in the first subframe set. Therefore, it can be ensured that interference to uplink reception by a neighboring cell of the first cell is reduced.

In a possible design, the uplink signal includes at least one of an uplink sounding signal, a preamble, and a sequence code.

In a possible design, the first uplink information is at least one of the uplink signal, a physical uplink control channel PUCCH, a physical uplink shared channel PUSCH, and a physical random access channel PRACH.

In a possible design, the first subframe set includes a muted subframe of a physical resource block for transmitting the PUCCH or muted subframes of all physical resource blocks.

In a possible design, the notifying, by the first cell, subframe configuration information to a terminal served by the first cell may be implemented in the following manner: sending, by the first cell, a broadcast message to the terminal served by the first cell, where the broadcast message carries the subframe configuration information; or sending, by the first cell, RRC signaling carrying the subframe configuration information to the terminal served by the first cell.

In a possible design, the method may further include: configuring, by the first cell, a second subframe set used for uplink transmission, where a subframe included in the second subframe set is used for uplink communication in the first cell; and sending, by the first cell, configuration information of the second subframe set to a second cell.

The first cell is a primary cell, and the second cell is a secondary cell; or the first cell is a macro cell, and the second cell is a micro cell.

In a possible design, the configuration information of the second subframe set is used to instruct the second cell to configure, based on the configuration information of the second subframe set, a third subframe set used for uplink transmission.

A subframe included in the third subframe set is used for uplink transmission in the second cell.

The subframe included in the third subframe set is different from the subframe included in the second subframe set.

In a possible design, the subframe in the second subframe set is further used for uplink transmission in an uplink hybrid automatic repeat request HARQ process in the first cell.

In a possible design, the configuring, by the first cell, a second subframe set used for uplink transmission for a second cell may be implemented in the following manner: configuring, by the first cell, the second subframe set for the second cell based on a radio resource configuration of the first cell and system information.

In a possible design, the configuring, by the first cell, the second subframe set for the second cell based on a radio resource configuration of the first cell and system information may be implemented in the following manner: selecting, by the first cell from subframes scheduled in a scheduling window of a system information block and subframes scheduled for paging detection, uplink subframes used for performing message feedbacks by a terminal, to form the subframe set.

In a possible design, the configuration information of the second subframe set is used to indicate that a terminal served by the second cell needs to be forbidden to perform uplink transmission in the second subframe set when the second cell performs uplink or downlink scheduling.

Specifically, the configuration information of the second subframe set is used to instruct the second cell to schedule a physical downlink shared channel PDSCH in a preconfigured first subframe, to prevent the terminal served by the second cell from performing a hybrid automatic repeat request HARQ feedback in the second subframe set; or the configuration information of the second subframe set is used to instruct the second cell to schedule a physical uplink shared channel PUSCH in a preconfigured second subframe, to prevent the terminal served by the second cell from first sending or retransmitting a data packet in the second subframe set.

According to a fourth aspect, an embodiment of this application provides an interference coordination method, where the method includes: receiving, by a second cell, a first subframe set sent by the first cell and used for uplink transmission in the first cell; and configuring, by the second cell based on the first subframe set, a second subframe set used for uplink transmission.

When transmitting an uplink signal, a terminal served by the second cell is prevented from using a subframe in the first subframe set, and the second cell configures the second subframe set, to schedule the served terminal to use a subframe in the second subframe set for uplink transmission. Therefore, it can be ensured that uplink interference to a neighboring cell of the second cell is reduced.

The first cell is a primary cell, and the second cell is a secondary cell; or the first cell is a macro cell, and the second cell is a micro cell.

In a possible design, a subframe included in the second subframe set is different from a subframe included in the first subframe set.

In a possible design, the subframe included in the second subframe set is used for uplink transmission in the second cell.

In this embodiment of this application, the method includes: forbidding a terminal served by the second cell to perform uplink transmission in the first subframe set when the second cell performs uplink or downlink scheduling.

The forbidding a terminal served by the second cell to perform uplink transmission in the first subframe set when the second cell performs uplink or downlink scheduling may be implemented in the following manner: a first implementation: scheduling, by the second cell, a physical downlink shared channel PDSCH in a subframe included in the configured second subframe set, thereby forbidding the terminal served by the second cell to perform a hybrid automatic repeat request HARQ feedback in the first subframe set; or a second implementation: scheduling, by the second cell, a physical uplink shared channel PUSCH in a subframe included in the configured second subframe set, thereby preventing the terminal served by the second cell from first sending or retransmitting a data packet in the first subframe set.

According to a fifth aspect, an embodiment of this application provides an interference coordination apparatus, where the apparatus is applied to a first cell and includes: a processor, configured to determine first configuration information of the first cell, where the first configuration information includes a parameter for transmitting uplink control information UCI by a terminal served by the first cell, the parameter included in the first configuration information is a parameter configured for the first cell and is a parameter orthogonal to a parameter configured for a second cell, and the second cell is a neighboring cell of the first cell; and a transceiver, configured to notify the first configuration information determined by the processor to the served terminal.

In a possible design, the served terminal is a terminal that is served by the first cell and on which an absolute value of a difference between signal strength received from the first cell and signal strength received from the second cell is less than a preset threshold.

In a possible design, the parameter included in the first configuration information is configured for the served terminal.

In a possible design, the parameter included in the first configuration information includes at least one of a cyclic shift value and an orthogonal sequence code.

In a possible design, the processor is specifically configured to select, by the first cell, a parameter from a first parameter pool, and generate the first configuration information, where the first parameter pool includes a plurality of parameters preconfigured for the first cell and used for transmitting the UCI by the terminal served by the first cell, and any two parameters are orthogonal to each other.

In a possible design, the first parameter pool includes a plurality of sequence codes and a plurality of cyclic shift values.

In a possible design, any two sequence codes included in the first parameter pool are orthogonal to each other, or any two cyclic shift values included in the first parameter pool are orthogonal to each other.

In a possible design, the parameters included in the first parameter pool are orthogonal to parameters included in a second parameter pool preconfigured for the second cell.

In a possible design, the transceiver is further configured to: before the processor determines the first configuration information of the first cell, receive second configuration information of the second cell notified by the second cell, where the second configuration information includes a parameter preconfigured for the second cell and used for transmitting UCI by a terminal served by the second cell. The processor is specifically configured to determine the first configuration information of the first cell based on the second configuration information of the second cell, where the parameter in the first configuration information is orthogonal to the parameter in the second configuration information.

In a possible design, the transceiver is specifically configured to send the first configuration information to the served terminal by using radio resource control RRC signaling.

In a possible design, the first cell is a secondary cell of the served terminal, and the served terminal is further connected to a primary cell; and the transceiver is specifically configured to instruct the primary cell to send the first configuration information to the served terminal.

In a possible design, the first cell is the secondary cell of the served terminal, and the served terminal is further connected to the primary cell; and the transceiver is further configured to: before the processor determines the first configuration information of the first cell, notify third configuration information preconfigured for the first cell to the primary cell, so that the primary cell selects, from at least one UCI parameter included in the third configuration information, a parameter that is orthogonal to a parameter included in received fourth configuration information sent by the second cell, and after generating the first configuration information, sends the first configuration information to the first cell; where the third configuration information includes at least one parameter used for transmitting the UCI by the terminal served by the first cell, and the fourth configuration information includes at least one parameter preconfigured for the second cell and used for transmitting UCI by a terminal served by the second cell.

In a possible design, the first cell is the secondary cell of the served terminal, and the served terminal is further connected to the primary cell; and the transceiver is further configured to: before the processor determines the first configuration information of the first cell, notify third configuration information preconfigured for the first cell to the primary cell, so that the primary cell reallocates at least one parameter to the first cell and the second cell separately based on the third configuration information and received fourth configuration information sent by the second cell; where the at least one parameter allocated to the first cell is orthogonal to the at least one parameter allocated to the second cell, the third configuration information includes at least one parameter used for transmitting the UCI by the terminal served by the first cell, and the fourth configuration information includes at least one parameter preconfigured for the second cell and used for transmitting UCI by a terminal served by the second cell.

The transceiver is further configured to receive the at least one parameter allocated to the first cell and sent by the primary cell; and the processor is specifically configured to select a parameter from the at least one parameter allocated to the first cell, and generate the first configuration information.

In a possible design, the first cell is the secondary cell of the served terminal, and the served terminal is further connected to the primary cell; and the transceiver is further configured to: before the processor determines the first configuration information of the first cell, notify third configuration information preconfigured for the first cell to the primary cell, so that the primary cell determines, based on the third configuration information and received fourth configuration information sent by the second cell, a first configuration mode for optimizing the third configuration information by the first cell and a second configuration mode for optimizing the fourth configuration information by the second cell; where at least one parameter included in the third configuration information optimized by the first cell based on the first configuration mode is orthogonal to at least one parameter included in the fourth configuration information optimized by the second cell based on the second configuration mode, the third configuration information includes at least one parameter used for transmitting the UCI by the terminal served by the first cell, and the fourth configuration information includes at least one parameter preconfigured for the second cell and used for transmitting UCI by a terminal served by the second cell.

The transceiver is further configured to receive the first configuration mode sent by the primary cell; and the processor is specifically configured to optimize the third configuration information based on the first configuration mode, and select a parameter from the at least one parameter included in the optimized third configuration information to generate the first configuration information.

According to a sixth aspect, an embodiment of this application further provides an interference coordination apparatus, where the apparatus is applied to a primary cell and includes: a processor, configured to determine first configuration information of a secondary cell, where a terminal of dual connectivity is connected to the primary cell and the secondary cell separately, and a parameter included in the first configuration information is a parameter allocated to the secondary cell and is a parameter orthogonal to a parameter allocated to a neighboring cell of the secondary cell; and a transceiver, configured to notify the first configuration information to the terminal of dual connectivity.

The parameter included in the first configuration information is used for transmitting uplink control information UCI by the terminal of dual connectivity.

In a possible design, the terminal of dual connectivity is located in an overlapping area between the secondary cell and the neighboring cell of the secondary cell.

In a possible design, the first configuration information includes at least one of a cyclic shift value and an orthogonal sequence code.

In a possible design, the first configuration information is configured for the terminal of dual connectivity.

In a possible design, the transceiver is further configured to: before the processor determines the first configuration information of the secondary cell, receive second configuration information sent by the secondary cell, and receive third configuration information sent by the neighboring cell, where the second configuration information includes at least one parameter used for transmitting UCI by a terminal served by the secondary cell, and the third configuration information includes at least one parameter used for transmitting UCI by a terminal served by the neighboring cell.

In a possible design, the processor is specifically configured to determine the first configuration information based on the second configuration information and the third configuration information.

The processor is specifically configured to select, from the at least one parameter included in the second configuration information, a parameter that is orthogonal to a parameter included in the third configuration information, and generate the first configuration information.

In a possible design, the processor is further configured to: after the transceiver receives the second configuration information sent by the secondary cell and receives the third configuration information sent by the neighboring cell, and before determining the first configuration information of the secondary cell, allocate at least one parameter to the secondary cell and the neighboring cell separately based on the second configuration information and the third configuration information, and notify the secondary cell and the neighboring cell, where the at least one parameter allocated to the secondary cell is orthogonal to the at least one parameter allocated to the neighboring cell.

Based on the foregoing design, the transceiver is further configured to receive the first configuration information sent by the secondary cell, where the first configuration information is generated based on a parameter that is selected from the at least one UCI parameter allocated to the secondary cell and used for sending the UCI by the terminal of dual connectivity after the secondary cell receives the at least one parameter allocated to the secondary cell and sent by the primary cell.

In a possible design, the processor is further configured to: after the transceiver receives the second configuration information sent by the secondary cell and receives the third configuration information sent by the neighboring cell, and before determining the first configuration information of the secondary cell, determine, based on the second configuration information and the third configuration information, a first configuration mode for optimizing the second configuration information by the secondary cell and a second configuration mode for optimizing the third configuration information by the neighboring cell; and the transceiver is further configured to send the first configuration mode to the secondary cell and send the second configuration mode to the neighboring cell; where at least one parameter included in the second configuration information optimized by the secondary cell based on the first configuration mode is orthogonal to at least one parameter included in the third configuration information optimized by the neighboring cell based on the second configuration mode.

Based on the foregoing design, the transceiver is further configured to receive the first configuration information sent by the secondary cell, where the first configuration information is generated based on a parameter that is selected from the at least one parameter included in the optimized second configuration information and used for transmitting the UCI by the terminal of dual connectivity after the secondary cell optimizes the second configuration information based on the first configuration mode.

In a possible design, the transceiver is specifically configured to send the first configuration information to the terminal of dual connectivity by using RRC signaling.

In a possible design, the transceiver is specifically configured to send a notification message to the terminal of dual connectivity, where the notification message is used to instruct the terminal of dual connectivity to obtain the first configuration information from the secondary cell.

According to a seventh aspect, an embodiment of this application further provides an interference coordination apparatus, where the apparatus is applied to a first cell and includes: a processor, configured to configure a first subframe set for first uplink information; and a transceiver, configured to notify subframe configuration information to a terminal served by the first cell, where the subframe configuration information includes at least one of the following: the first subframe set, a subset of the first subframe set, a complementary set of the first subframe set, and a subset of the complementary set of the first subframe set, and a subframe included in the subframe configuration information is used by the served terminal to transmit an uplink signal.

In a possible design, the uplink signal includes at least one of an uplink sounding signal, a preamble, and a sequence code.

In a possible design, the first uplink information is at least one of the uplink signal, a physical uplink control channel PUCCH, a physical uplink shared channel PUSCH, and a physical random access channel PRACH.

In a possible design, the first subframe set includes a muted subframe of a physical resource block for transmitting the PUCCH or muted subframes of all physical resource blocks.

In a possible design, the transceiver is specifically configured to: send a broadcast message to the terminal served by the first cell, where the broadcast message carries the subframe configuration information; or send RRC signaling carrying the subframe configuration information to the terminal served by the first cell.

In a possible design, the processor is further configured to configure a second subframe set used for uplink transmission, where a subframe included in the second subframe set is used for uplink communication in the first cell; and the transceiver is further configured to send configuration information of the second subframe set to a second cell.

The first cell is a primary cell, and the second cell is a secondary cell; or the first cell is a macro cell, and the second cell is a micro cell.

In a possible design, the configuration information of the second subframe set is used to instruct the second cell to configure, based on the configuration information of the second subframe set, a third subframe set used for uplink transmission.

In a possible design, a subframe included in the third subframe set is used for uplink transmission in the second cell.

In a possible design, the subframe included in the third subframe set is different from the subframe included in the second subframe set.

In a possible design, the subframe in the second subframe set is further used for uplink transmission in an uplink hybrid automatic repeat request HARQ process in the first cell.

In a possible design, the processor is specifically configured to configure the second subframe set for the second cell based on a radio resource configuration of the first cell and system information.

In a possible design, the processor is specifically configured to select, from subframes scheduled in a scheduling window of a system information block and subframes scheduled for paging detection, uplink subframes used for performing message feedbacks by a terminal, to form the subframe set.

In a possible design, the configuration information of the second subframe set is used to indicate that a terminal served by the second cell needs to be forbidden to perform uplink transmission in the second subframe set when the second cell performs uplink or downlink scheduling.

In a possible design, the configuration information of the second subframe set is used to instruct the second cell to schedule a physical downlink shared channel PDSCH in a preset first subframe, to prevent the terminal served by the secondary cell from performing a hybrid automatic repeat request HARQ feedback in the second subframe set.

In a possible design, the configuration information of the second subframe set is used to instruct the second cell to schedule a physical uplink shared channel PUSCH in a preconfigured second subframe, to prevent the terminal served by the second cell from first sending or retransmitting a data packet in the second subframe set.

According to an eighth aspect, this application further provides an interference coordination apparatus, where the apparatus is applied to a second cell and includes: a transceiver, configured to receive a first subframe set sent by the first cell and used for uplink transmission in the first cell; and a processor, configured to configure, based on the first subframe set, a second subframe set used for uplink transmission.

In a possible design, the first cell is a primary cell, and the second cell is a secondary cell; or the first cell is a macro cell, and the second cell is a micro cell.

In a possible design, a subframe included in the second subframe set is different from a subframe included in the first subframe set.

In a possible design, the subframe included in the second subframe set is used for uplink transmission in the second cell.

In a possible design, when performing uplink or downlink scheduling, the processor is further configured to forbid a terminal served by the second cell to perform uplink transmission in the first subframe set.

In a possible design, the processor is specifically configured to schedule a physical downlink shared channel PDSCH in a subframe included in the second subframe set, thereby forbidding the terminal served by the secondary cell to perform a hybrid automatic repeat request HARQ feedback in the first subframe set.

In a possible design, the processor is specifically configured to schedule a physical uplink shared channel PUSCH in a subframe included in the second subframe set, thereby preventing the terminal served by the second cell from first sending or retransmitting a data packet in the first subframe set.

According to a ninth aspect, this application further provides an interference coordination apparatus, where the apparatus is applied to a first cell and includes: a processing unit, configured to determine first configuration information of the first cell, where the first configuration information includes a parameter for transmitting uplink control information UCI by a terminal served by the first cell, the parameter included in the first configuration information is a parameter configured for the first cell and is a parameter orthogonal to a parameter configured for a second cell, and the second cell is a neighboring cell of the first cell; and a notifying unit, configured to notify the first configuration information determined by the processing unit to the served terminal.

In a possible design, the served terminal is a terminal that is served by the first cell and on which an absolute value of a difference between signal strength received from the first cell and signal strength received from the second cell is less than a preset threshold.

In a possible design, the parameter included in the first configuration information is configured for the served terminal.

In a possible design, the parameter included in the first configuration information includes at least one of a cyclic shift value and an orthogonal sequence code.

In a possible design, the processing unit is specifically configured to: select, by the first cell, a parameter from a first parameter pool, and generate the first configuration information, where the first parameter pool includes a plurality of parameters preconfigured for the first cell and used for transmitting the UCI by the terminal served by the first cell, and any two parameters are orthogonal to each other.

In a possible design, the first parameter pool includes a plurality of sequence codes and a plurality of cyclic shift values.

In a possible design, any two sequence codes included in the first parameter pool are orthogonal to each other, or any two cyclic shift values included in the first parameter pool are orthogonal to each other.

In a possible design, the parameters included in the first parameter pool are orthogonal to parameters included in a second parameter pool preconfigured for the second cell.

In a possible design, the apparatus further includes a receiving unit, configured to: before the processing unit determines the first configuration information of the first cell, receive second configuration information of the second cell notified by the second cell, where the second configuration information includes a parameter preconfigured for the second cell and used for transmitting UCI by a terminal served by the second cell.

In a possible design, the processing unit is specifically configured to determine the first configuration information of the first cell based on the second configuration information of the second cell, where the parameter in the first configuration information is orthogonal to the parameter in the second configuration information.

In a possible design, the notifying unit is specifically configured to send the first configuration information to the served terminal by using radio resource control RRC signaling.

In a possible design, the first cell is a secondary cell of the served terminal, and the served terminal is further connected to a primary cell; and the notifying unit is specifically configured to instruct the primary cell to send the first configuration information to the served terminal.

In a possible design, the first cell is the secondary cell of the served terminal, and the served terminal is further connected to the primary cell; and the notifying unit is further configured to: before the processing unit determines the first configuration information of the first cell, notify third configuration information preconfigured for the first cell to the primary cell, so that the primary cell selects, from at least one UCI parameter included in the third configuration information, a parameter that is orthogonal to a parameter included in received fourth configuration information sent by the second cell, and after generating the first configuration information, sends the first configuration information to the first cell; where the third configuration information includes at least one parameter used for transmitting the UCI by the terminal served by the first cell, and the fourth configuration information includes at least one parameter preconfigured for the second cell and used for transmitting UCI by a terminal served by the second cell.

In a possible design, the first cell is the secondary cell of the served terminal, and the served terminal is further connected to the primary cell; and the notifying unit is further configured to: before the processing unit determines the first configuration information of the first cell, notify third configuration information preconfigured for the first cell to the primary cell, so that the primary cell reallocates at least one parameter to the first cell and the second cell separately based on the third configuration information and received fourth configuration information sent by the second cell; where the at least one parameter allocated to the first cell is orthogonal to the at least one parameter allocated to the second cell, the third configuration information includes at least one parameter used for transmitting the UCI by the terminal served by the first cell, and the fourth configuration information includes at least one parameter preconfigured for the second cell and used for transmitting UCI by a terminal served by the second cell.

In a possible design, the apparatus further includes a receiving unit, configured to receive the at least one parameter allocated to the first cell and sent by the primary cell; and the processing unit is specifically configured to select a parameter from the at least one parameter allocated to the first cell, and generate the first configuration information.

In a possible design, the first cell is the secondary cell of the served terminal, and the served terminal is further connected to the primary cell; and the notifying unit is further configured to: before the processing unit determines the first configuration information of the first cell, notify third configuration information preconfigured for the first cell to the primary cell, so that the primary cell determines, based on the third configuration information and received fourth configuration information sent by the second cell, a first configuration mode for optimizing the third configuration information by the first cell and a second configuration mode for optimizing the fourth configuration information by the second cell; where at least one parameter included in the third configuration information optimized by the first cell based on the first configuration mode is orthogonal to at least one parameter included in the fourth configuration information optimized by the second cell based on the second configuration mode, the third configuration information includes at least one parameter used for transmitting the UCI by the terminal served by the first cell, and the fourth configuration information includes at least one parameter preconfigured for the second cell and used for transmitting UCI by a terminal served by the second cell.

In a possible design, the apparatus further includes a receiving unit, configured to receive the first configuration mode sent by the primary cell; and the processing unit is specifically configured to optimize the third configuration information based on the first configuration mode, and select a parameter from the at least one parameter included in the optimized third configuration information to generate the first configuration information.

According to a tenth aspect, an embodiment of this application provides an interference coordination apparatus, where the apparatus is applied to a primary cell and includes: a processing unit, configured to determine first configuration information of a secondary cell, where a terminal of dual connectivity is connected to the primary cell and the secondary cell separately, the first configuration information includes a parameter used for transmitting uplink control information UCI by the terminal of dual connectivity, and a parameter included in the first configuration information is a parameter allocated to the secondary cell and is a parameter orthogonal to a parameter allocated to a neighboring cell of the secondary cell; and a notifying unit, configured to notify the first configuration information to the terminal of dual connectivity.

In a possible design, the terminal of dual connectivity is located in an overlapping area between the secondary cell and the neighboring cell of the secondary cell.

In a possible design, the first configuration information includes at least one of a cyclic shift value and an orthogonal sequence code.

In a possible design, the first configuration information is configured for the terminal of dual connectivity.

In a possible design, the apparatus further includes a receiving unit, configured to: before the processing unit determines the first configuration information of the secondary cell, receive second configuration information sent by the secondary cell, and receive third configuration information sent by the neighboring cell, where the second configuration information includes at least one parameter used for transmitting UCI by a terminal served by the secondary cell, and the third configuration information includes at least one parameter used for transmitting UCI by a terminal served by the neighboring cell.

In a possible design, the processing unit is specifically configured to determine the first configuration information based on the second configuration information and the third configuration information.

In a possible design, the processing unit is specifically configured to select, from the at least one parameter included in the second configuration information, a parameter that is orthogonal to a parameter included in the third configuration information, and generate the first configuration information.

In a possible design, the processing unit is further configured to: after the receiving unit receives the second configuration information sent by the secondary cell and receives the third configuration information sent by the neighboring cell, and before determining the first configuration information of the secondary cell, allocate at least one parameter to the secondary cell and the neighboring cell separately based on the second configuration information and the third configuration information, and notify the secondary cell and the neighboring cell, where the at least one parameter allocated to the secondary cell is orthogonal to the at least one parameter allocated to the neighboring cell.

In a possible design, the receiving unit is further configured to receive the first configuration information sent by the secondary cell, where the first configuration information is generated based on a parameter that is selected from the at least one UCI parameter allocated to the secondary cell and used for sending the UCI by the terminal of dual connectivity after the secondary cell receives the at least one parameter allocated to the secondary cell and sent by the primary cell.

In a possible design, the processing unit is further configured to: after the receiving unit receives the second configuration information sent by the secondary cell and receives the third configuration information sent by the neighboring cell, and before determining the first configuration information of the secondary cell, determine, based on the second configuration information and the third configuration information, a first configuration mode for optimizing the second configuration information by the secondary cell and a second configuration mode for optimizing the third configuration information by the neighboring cell; and the notifying unit is further configured to send the first configuration mode to the secondary cell and send the second configuration mode to the neighboring cell; where at least one parameter included in the second configuration information optimized by the secondary cell based on the first configuration mode is orthogonal to at least one parameter included in the third configuration information optimized by the neighboring cell based on the second configuration mode.

In a possible design, the receiving unit is further configured to receive the first configuration information sent by the secondary cell, where the first configuration information is generated based on a parameter that is selected from the at least one parameter included in the optimized second configuration information and used for transmitting the UCI by the terminal of dual connectivity after the secondary cell optimizes the second configuration information based on the first configuration mode.

In a possible design, the notifying unit is specifically configured to send the first configuration information to the terminal of dual connectivity by using RRC signaling.

In a possible design, the notifying unit is specifically configured to send a notification message to the terminal of dual connectivity, where the notification message is used to instruct the terminal of dual connectivity to obtain the first configuration information from the secondary cell.

According to an eleventh aspect, an embodiment of this application provides an interference coordination apparatus, where the apparatus is applied to a first cell and includes: a first processing unit, configured to configure a first subframe set for first uplink information; and a first notifying unit, configured to notify subframe configuration information to a terminal served by the first cell, where the subframe configuration information includes at least one of the following: the first subframe set, a subset of the first subframe set, a complementary set of the first subframe set, and a subset of the complementary set of the first subframe set, and a subframe included in the subframe configuration information is used by the served terminal to transmit an uplink signal.

In a possible design, the uplink signal includes at least one of an uplink sounding signal, a preamble, and a sequence code.

In a possible design, the first uplink information is at least one of the uplink signal, a physical uplink control channel PUCCH, a physical uplink shared channel PUSCH, and a physical random access channel PRACH.

In a possible design, the first subframe set includes a muted subframe of a physical resource block for transmitting the PUCCH or muted subframes of all physical resource blocks.

In a possible design, the first notifying unit is specifically configured to: send a broadcast message to the terminal served by the first cell, where the broadcast message carries the subframe configuration information; or send RRC signaling carrying the subframe configuration information to the terminal served by the first cell.

In a possible design, the apparatus further includes: a second processing unit, configured to configure a second subframe set used for uplink transmission, where a subframe included in the second subframe set is used for uplink communication in the first cell; and a second notifying unit, configured to send configuration information of the second subframe set to a second cell.

In a possible design, the first cell is a primary cell, and the second cell is a secondary cell; or the first cell is a macro cell, or the first cell is a micro cell.

In a possible design, the configuration information of the second subframe set is used to instruct the second cell to configure, based on the configuration information of the second subframe set, a third subframe set used for uplink transmission.

In a possible design, a subframe included in the third subframe set is used for uplink transmission in the second cell.

In a possible design, the subframe included in the third subframe set is different from the subframe included in the second subframe set.

In a possible design, the subframe in the second subframe set is further used for uplink transmission in an uplink hybrid automatic repeat request HARQ process in the first cell.

In a possible design, the second processing unit is specifically configured to configure the second subframe set for the second cell based on a radio resource configuration of the first cell and system information.

In a possible design, the second processing unit is specifically configured to select, from subframes scheduled in a scheduling window of a system information block and subframes scheduled for paging detection, uplink subframes used for performing message feedbacks by a terminal, to form the subframe set.

In a possible design, the configuration information of the second subframe set is used to indicate that a terminal served by the second cell needs to be forbidden to perform uplink transmission in the second subframe set when the second cell performs uplink or downlink scheduling.

In a possible design, the configuration information of the second subframe set is used to instruct the second cell to schedule a physical downlink shared channel PDSCH in a preset first subframe, to prevent the terminal served by the secondary cell from performing a hybrid automatic repeat request HARQ feedback in the second subframe set.

In a possible design, the configuration information of the second subframe set is used to instruct the second cell to schedule a physical uplink shared channel PUSCH in a preconfigured second subframe, to prevent the terminal served by the second cell from first sending or retransmitting a data packet in the second subframe set.

According to a twelfth aspect, an embodiment of this application provides an interference coordination apparatus, where the apparatus is applied to a second cell and includes: a receiving unit, configured to receive a first subframe set sent by the first cell and used for uplink transmission in the first cell; and a processing unit, configured to configure, based on the first subframe set, a second subframe set used for uplink transmission.

In a possible design, the first cell is a primary cell, and the second cell is a secondary cell; or the first cell is a macro cell, and the second cell is a micro cell.

In a possible design, a subframe included in the second subframe set is different from a subframe included in the first subframe set.

In a possible design, the subframe included in the second subframe set is used for uplink transmission in the second cell.

In a possible design, when performing uplink or downlink scheduling, the processing unit is further configured to prevent a terminal served by the second cell from performing uplink transmission in the first subframe set.

In a possible design, the processing unit is specifically configured to schedule a physical downlink shared channel PDSCH in a subframe included in the second subframe set, thereby forbidding the terminal served by the secondary cell to perform a hybrid automatic repeat request HARQ feedback in the first subframe set.

In a possible design, the processing unit is specifically configured to schedule a physical uplink shared channel PUSCH in a subframe included in the second subframe set, thereby preventing the terminal served by the second cell from first sending or retransmitting a data packet in the first subframe set.

BRIEF DESCRIPTION OF THE DRAWINGS

FIG. 1 is an architectural diagram of a system for interference coordination according to an embodiment of this application;

FIG. 2 is a flowchart of an interference coordination method according to an embodiment of this application;

DETAILED DESCRIPTION OF ILLUSTRATIVE EMBODIMENTS

Figure 3:
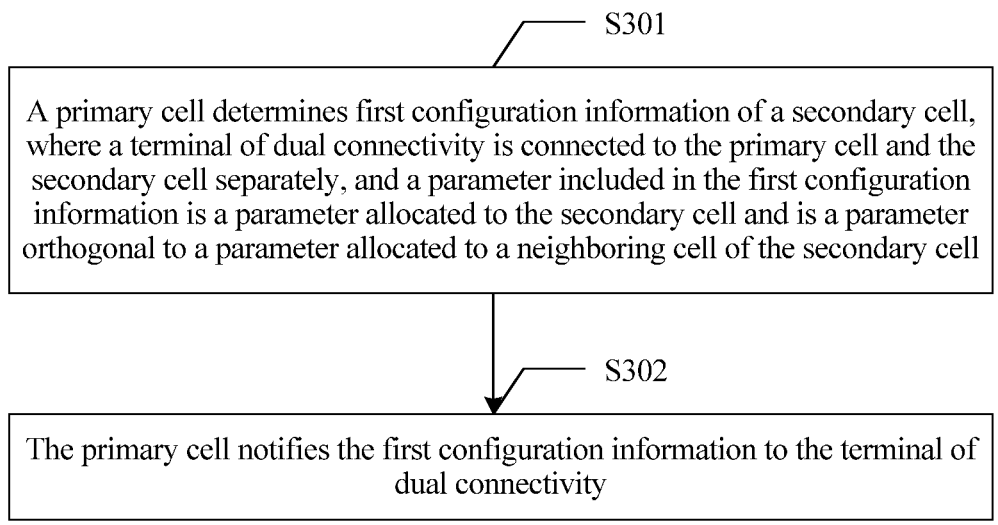
FIG. 3 is a flowchart of another interference coordination method according to an embodiment of this application.

To make the objectives, technical solutions, and advantages of this application clearer, the following further describes this application in detail with reference to the accompanying drawings. Apparently, the described embodiments are merely a part rather than all of the embodiments of this application. All other embodiments obtained by persons of ordinary skill in the art based on the embodiments of this application without creative efforts shall fall within the protection scope of this application.

Embodiments of this application provide an interference coordination method and apparatus to reduce interference in uplink transmission. The method and the apparatus are based on a same inventive concept. The method and the apparatus have similar principles for resolving the problems. Therefore, for implementation of the apparatus and the method, reference may be made to each other, and details of repeated parts are not described.

FIG. 1 is a schematic architectural diagram of a system to which an embodiment of this application is applicable. As shown in FIG. 1, a terminal 101 is located in an overlapping coverage area between a first cell 102a and a second cell 102b. In this case, the terminal 101 establishes a connection to the first cell 102b.

This embodiment of this application is applicable to a plurality of scenarios. When this embodiment is applicable to a concept of a virtual cell, and the terminal is located in the virtual cell, the terminal usually keeps a radio resource control (RRC for short) connection with a main transmission point or a cluster head (cluster head). In this application, the main transmission point or the cluster head is referred to as a primary cell, as shown by a primary cell 103 in FIG. 1. When the terminal adds, changes, transfers, or switches a link in the virtual cell, the terminal usually needs to exchange information with the primary cell. Other cells than the primary cell in the virtual cell are secondary cells. The terminal is connected to both the primary cell and a secondary cell; data is transmitted between the secondary cell and the terminal; and signaling needs to be transmitted between the secondary cell and the terminal through the primary cell.

Various aspects in this specification are described with reference to the terminal and/or cells. The terminal refers to a device (device) providing voice and/or data connectivity for a user, and includes a wireless terminal or a wired terminal. The wireless terminal may be a handheld device with a wireless connection function, another processing device connected to a wireless modem, or a mobile terminal that communicates with one or more core networks by using a radio access network. For example, the wireless terminal may be a mobile phone (also referred to as a "cellular" phone) and a computer with a mobile terminal. For another example, the wireless terminal may be a portable, pocket-sized, handheld, computer-built-in, or in-vehicle mobile apparatus. For another example, the wireless terminal may be a part of a mobile station (mobile station), an access point (access point), or user equipment (UE for short).

This embodiment of this application may be applied to a low-frequency system, or may be applied to a high-frequency system. Control information or control channels in this embodiment of this application may be all based on beamforming (beamforming).

An embodiment of this application provides an interference coordination method to avoid uplink interference. On one hand, a parameter used for transmitting uplink control information (UCI for short) is configured for a serving cell of a terminal or a terminal, where the parameter is a parameter allocated to the serving cell and is a parameter orthogonal to a parameter allocated to a neighboring cell of the serving cell, and is therefore notified by the serving cell to the terminal. Therefore, the terminal can transmit the UCI based on a resource indicated by the parameter. This can ensure that the terminal is free from interference even if the terminal is located in an overlapping area between the serving cell and the neighboring cell. On the other hand, the cell may also configure a subframe set used for transmitting a sounding signal or a sounding reference signal or any uplink signal by the terminal served by the cell. Certainly, a subframe included in the configured subframe set is a subframe in which uplink coordination is performed. The served terminal is allowed to use only the subframe in the subframe set to transmit the sounding signal or the sounding reference signal or any uplink signal. Therefore, when the terminal uses the subframe set to transmit the sounding signal or the sounding reference signal or any uplink signal, it is ensured that interference to uplink reception by any neighboring cell is reduced.

Referring to FIG. 2, FIG. 2 is an example of a flowchart of an interference coordination method. The method includes the following steps.

S201. A first cell determines first configuration information of the first cell, where the first configuration information includes a parameter for transmitting UCI by a terminal served by the first cell, the parameter included in the first configuration information is a parameter configured for the first cell and is a parameter orthogonal to a parameter configured for a second cell, and the second cell is a neighboring cell of the first cell.

S202. The first cell notifies the first configuration information to the served terminal.

The served terminal is a terminal that is served by the first cell and on which an absolute value of a difference between signal strength received from the first cell and signal strength received from the second cell is less than a preset threshold. When the absolute value of the difference between the signal strength received from the first cell and the signal strength received from the second cell by the served terminal is less than the preset threshold, the served terminal is located in an overlapping area between the first cell and the second cell. The served terminal in subsequent descriptions is a terminal connected to the first cell, that is, a terminal served by the first cell.

In this embodiment of this application, the parameter configured for the second cell may be one or more parameters. When a plurality of parameters are configured for the second cell, the parameter included in the first configuration information is a parameter configured for the first cell and is a parameter orthogonal to the plurality of parameters configured for the second cell.

The received signal strength may be at least one of reference signal received power (RSRP for short), reference signal received quality (RSRQ for short), a received signal strength indicator (RSSI for short), and the like.

When the served terminal is located in the overlapping area between the first cell and the second cell, the first configuration information is determined for the served terminal, so that when the served terminal transmits the UCI by using a resource indicated by the parameter included in the first configuration information, it is ensured that no interference is caused to other terminals that are located in an area of the second cell and access the second cell and terminals that are located in an area of the first cell and access the first cell during uplink transmission in the second cell and uplink transmission in the first cell. In addition, for a terminal that is not located in the overlapping area and accesses the first cell, a resource configured in the prior art may be used to transmit UCI.

Optionally, the parameter included in the first configuration information may be preconfigured for the served terminal. Specifically, when the terminal accesses the first cell and the terminal is located in the overlapping area between the first cell and the second cell, the first cell may allocate the parameter to the terminal, and deliver the parameter to the terminal, so that the terminal can transmit the UCI by using the resource indicated by the parameter.

The first configuration information may include at least one of a cyclic shift value and an orthogonal sequence.

In a possible implementation, a base station may preconfigure a common parameter pool for neighboring cells in which severe interference exists, where any two parameters included in the parameter pool are orthogonal to each other, and a parameter in the parameter pool indicates a resource used for transmitting UCI by a terminal served by any one of the neighboring cells. Therefore, any one of the neighboring cells can select a parameter from the parameter pool and notify the parameter to the terminal, so that the terminal transmits the UCI by using the resource indicated by the parameter for transmitting the UCI. The base station may further preconfigure a parameter pool separately for each of the neighboring cells in which severe interference exists, where parameter pools configured for different cells are orthogonal to each other, and a parameter configured for each cell indicates a resource used for transmitting UCI by a terminal served by the cell.

Therefore, that a first cell determines first configuration information of the first cell may be implemented in the following manner:

The first cell selects a parameter from a preconfigured first parameter pool, and generates the first configuration information, where the first parameter pool includes a plurality of parameters preconfigured for the first cell and used for transmitting the UCI by the terminal served by the first cell, and any two parameters are orthogonal to each other.

Optionally, the first parameter pool includes a plurality of sequence codes or a plurality of cyclic shift values. Any two sequence codes included in the first parameter pool are orthogonal to each other, or any two cyclic shift values included in the first parameter pool are orthogonal to each other.

When the base station configures a parameter pool separately for each cell, parameters included in the first parameter pool preconfigured for the first cell are orthogonal to parameters included in a second parameter pool preconfigured for the second cell.

In a possible implementation, cells share a parameter used for transmitting UCI. Therefore, a cell may preconfigure, according to a parameter of a neighboring cell, a parameter used for transmitting UCI by a served terminal, where the parameter configured for the cell is orthogonal to the parameter of the neighboring cell.

Therefore, before the first cell determines the first configuration information of the first cell, the first cell receives second configuration information of the second cell notified by the second cell, where the second configuration information is used to indicate at least one parameter for transmitting UCI by a terminal served by the second cell.

When determining the first configuration information of the first cell, the first cell determines the first configuration information of the first cell based on the second configuration information of the second cell, where the parameter in the first configuration information is orthogonal to the parameter in the second configuration information.

When the second configuration information includes a plurality of parameters, the parameter in the first configuration information is orthogonal to the plurality of parameters included in the second configuration information.

In a possible implementation, when the first cell notifies the first configuration information to the served terminal, the first cell may send the first configuration information to the served terminal by using radio resource control (English: Radio Resource Control, RRC for short) signaling.

This embodiment of this application may be further applied to a virtual cell. The first cell is a secondary cell of the served terminal, and the served terminal is further connected to a primary cell. Both the secondary cell and the primary cell are serving cells of the served terminal. Therefore, when the first cell notifies the first configuration information to the served terminal, the secondary cell (the first cell) of the served terminal may instruct the primary cell to send the first configuration information to the served terminal; or the primary cell may instruct the served terminal to obtain the first configuration information from the secondary cell.

Each secondary cell located in the virtual cell separately notifies, to the primary cell, a parameter that is preallocated by the base station to the secondary cell and is used for transmitting UCI by a terminal served by the secondary cell. On one hand, after receiving the parameter corresponding to each secondary cell, the primary cell reallocates a parameter to each secondary cell based on the parameters, to ensure that parameters allocated to neighboring secondary cells are orthogonal to each other. The primary cell sends each reallocated parameter to each secondary cell. On the other hand, after receiving the parameter of each secondary cell, the primary cell may separately determine a configuration mode for optimizing the parameter by each secondary cell, and separately send the determined configuration mode to each secondary cell. Therefore, parameters optimized by different secondary cells based on the configuration modes are orthogonal to each other.

In a possible implementation, the first cell is the secondary cell of the served terminal, the served terminal is further connected to the primary cell, and before the first cell determines the first configuration information of the first cell, the first cell notifies third configuration information preconfigured for the first cell to the primary cell, so that the primary cell selects, from at least one parameter included in the third configuration information, at least one parameter that is orthogonal to a parameter included in received fourth configuration information sent by the second cell, and sends the at least one parameter to the first cell; where the third configuration information includes at least one parameter used for transmitting the UCI by the terminal served by the first cell, and the fourth configuration information includes at least one parameter preconfigured for the second cell and used for transmitting UCI by a terminal served by the second cell. The third configuration information and the fourth configuration information are preconfigured by the base station for the first cell and the second cell respectively. The first cell may select a parameter from the received orthogonal parameters sent by the primary cell to generate the first configuration information and then instruct the primary cell to send the first configuration information to the terminal served by the first cell; or the primary cell may select a parameter from the orthogonal parameters to generate the first configuration information and then send the first configuration information to the first cell and the terminal served by the first cell.

In another possible implementation, before the first cell determines the first configuration information of the first cell, the first cell notifies third configuration information allocated to the first cell to the primary cell, so that the primary cell reallocates at least one parameter to the first cell and the second cell separately based on the third configuration information and received fourth configuration information sent by the second cell; where the at least one parameter allocated to the first cell is orthogonal to the at least one parameter allocated to the second cell.

Therefore, that a first cell determines first configuration information of the first cell may be implemented in the following manner:

The first cell receives the at least one parameter allocated by the primary cell to the first cell and sent by the primary cell; and the first cell selects a parameter from the at least one parameter allocated by the primary cell to the first cell, and generates the first configuration information.

In still another possible implementation, before the first cell determines the first PUCCH configuration information of the first cell, the first cell notifies third configuration information allocated to the first cell to the primary cell, so that the primary cell determines, based on the third configuration information and received fourth configuration information sent by the second cell, a first configuration mode for optimizing the third configuration information by the first cell and a second configuration mode for optimizing the fourth configuration information by the second cell; where at least one parameter included in the third configuration information optimized by the first cell based on the first configuration mode is orthogonal to at least one parameter included in the fourth configuration information optimized by the second cell based on the second configuration mode.

Therefore, that a first cell determines first configuration information of the first cell may be implemented in the following manner: The first cell receives the first configuration mode sent by the primary cell; and the first cell optimizes the third configuration information based on the first configuration mode, and selects a parameter from the at least one parameter included in the optimized third configuration information to generate the first configuration information.

An embodiment of this application further provides an interference coordination method, where the method is applicable to a scenario of a virtual cell. As shown in FIG. 3, the method includes the following steps.

S301. A primary cell determines first configuration information of a secondary cell, where a terminal of dual connectivity is connected to the primary cell and the secondary cell separately, and a parameter included in the first configuration information is a parameter allocated to the secondary cell and is a parameter orthogonal to a parameter allocated to a neighboring cell of the secondary cell.

The parameter included in the first configuration information is used for transmitting UCI by the terminal of dual connectivity.

S302. The primary cell notifies the first configuration information to the terminal of dual connectivity.

The terminal of dual connectivity is located in an overlapping area between the secondary cell and the neighboring cell of the secondary cell.

In the manner provided by this embodiment of this application, the primary cell determines, for the secondary cell, the parameter used for transmitting the UCI by the terminal of dual connectivity, and the parameter corresponding to the secondary cell is orthogonal to the parameter of the neighboring cell of the secondary cell, thereby ensuring that no interference is caused to the neighboring cell when a terminal served by the secondary cell transmits UCI.

The first configuration information includes at least one of a cyclic shift value and an orthogonal sequence code.

Optionally, the first configuration information is preconfigured for the terminal of dual connectivity.

In a possible implementation, before the primary cell determines the first configuration information of the secondary cell, the method further includes: the primary cell receives second configuration information sent by the secondary cell, and receives third configuration information sent by the neighboring cell, where the second configuration information includes at least one parameter used for transmitting UCI by a terminal served by the secondary cell, and the third configuration information includes at least one parameter used for transmitting UCI by a terminal served by the neighboring cell.

Therefore, that a primary cell determines first configuration information of a secondary cell may be implemented in the following manner:

The primary cell determines the first configuration information based on the second configuration information and the third configuration information.

Optionally, that the primary cell determines the first configuration information based on the second configuration information and the third configuration information may be implemented in the following manner:

The primary cell selects, from the at least one parameter included in the second configuration information, a parameter that is orthogonal to a parameter included in the third configuration information, and generates the first configuration information.

The primary cell may directly send the first configuration information to the terminal of dual connectivity, or may send the first configuration information to the secondary cell and send a notification message to the terminal of dual connectivity, where the notification message is used to instruct the terminal of dual connectivity to obtain the first configuration information from the secondary cell.

In another possible implementation, after the primary cell receives the second configuration information sent by the secondary cell, and receives the third configuration information sent by the neighboring cell, the primary cell allocates at least one parameter to the secondary cell and the neighboring cell separately based on the second configuration information and the third configuration information, and notifies the secondary cell and the neighboring cell, where the at least one parameter allocated to the secondary cell is orthogonal to the at least one parameter allocated to the neighboring cell.

After receiving the at least one parameter allocated to the secondary cell and sent by the primary cell, the secondary cell selects, from the allocated at least one parameter, a parameter used for sending the UCI by the terminal of dual connectivity, and generates the first configuration information based on the selected parameter.

Therefore, that a primary cell determines first configuration information of the secondary cell may be implemented in the following manner:

The primary cell receives the first configuration information sent by the secondary cell, where the first configuration information is generated based on a parameter that is selected from the at least one parameter allocated to the secondary cell and used for sending the UCI by the terminal of dual connectivity after the secondary cell receives the at least one parameter allocated to the secondary cell and sent by the primary cell.

After receiving the first configuration information, the primary cell may directly send the first configuration information to the terminal of dual connectivity, or may send a notification message to the terminal of dual connectivity, where the notification message is used to instruct the terminal of dual connectivity to obtain the first configuration information from the secondary cell.

In still another possible implementation, after the primary cell receives the second configuration information sent by the secondary cell, and receives the third configuration information sent by the neighboring cell, the primary cell determines, based on the second configuration information and the third configuration information, a first configuration mode for optimizing the second configuration information by the secondary cell and a second configuration mode for optimizing the third configuration information by the neighboring cell, and sends the first configuration mode to the secondary cell and sends the second configuration mode to the neighboring cell; where at least one parameter included in the second configuration information optimized by the secondary cell based on the first configuration mode is orthogonal to at least one parameter included in the third configuration information optimized by the neighboring cell based on the second configuration mode.

After receiving the first configuration mode, the secondary cell optimizes the second configuration information based on the first configuration mode, selects, from the optimized second configuration information, a parameter used for transmitting the UCI by the terminal of dual connectivity, generates the first configuration information based on the selected parameter, and sends the first configuration information to the primary cell.

Therefore, that a primary cell determines first configuration information of the secondary cell may be implemented in the following manner:

The primary cell receives the first configuration information sent by the secondary cell, where the first configuration information is generated based on a parameter that is selected from the at least one parameter included in the optimized second configuration information and used for transmitting the UCI by the terminal of dual connectivity after the secondary cell optimizes the second configuration information based on the first configuration mode.

After receiving the first configuration information, the primary cell may directly send the first configuration information to the terminal of dual connectivity, or may send a notification message to the terminal of dual connectivity, where the notification message is used to instruct the terminal of dual connectivity to obtain the first configuration information from the secondary cell.

Certainly, after generating the first configuration information, the secondary cell may not send the first configuration information to the primary cell either, but directly notifies the primary cell that the parameter used for transmitting the UCI by the terminal of dual connectivity has been configured. Therefore, the primary cell instructs the terminal of dual connectivity to obtain the first configuration information from the secondary cell.

In this embodiment of this application, that the primary cell notifies the first configuration information to the terminal of dual connectivity may be implemented in the following manner:

The primary cell sends the first configuration information to the terminal of dual connectivity by using RRC signaling; or the primary cell sends a notification message to the terminal of dual connectivity, where the notification message is used to instruct the terminal of dual connectivity to obtain the first configuration information from the secondary cell.

Figure 4:
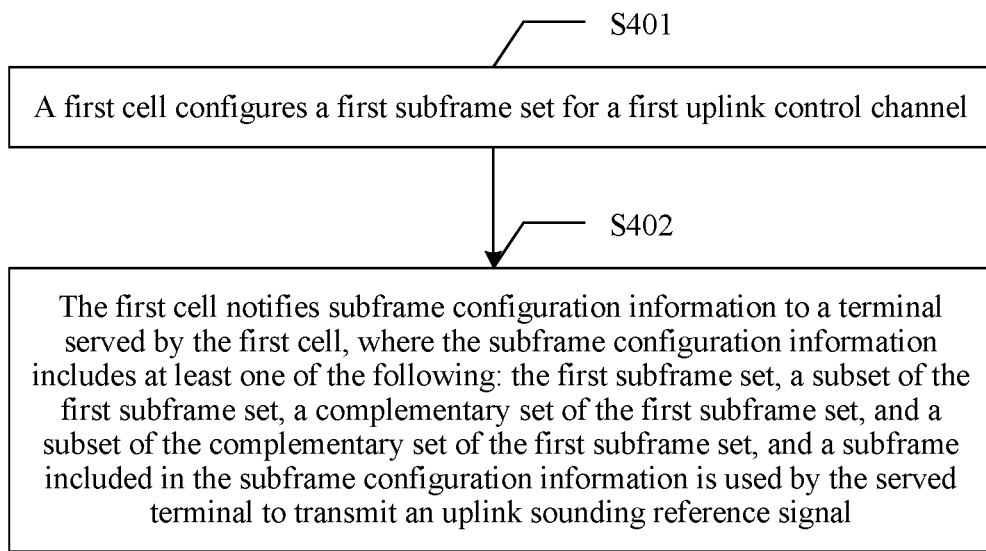
FIG. 4 is a flowchart of still another interference coordination method according to an embodiment of this application.

An embodiment of this application further provides an interference coordination method. In the method, uplink transmission of a terminal is limited to coordinated fixed subframes, so that interference between uplink transmission of the terminal and uplink transmission of a base station is reduced. As shown in FIG. 4, the method includes the following steps.

S401. A first cell configures a first subframe set for first uplink information.

S402. The first cell notifies subframe configuration information to a terminal served by the first cell, where the subframe configuration information includes at least one of the following: the first subframe set, a subset of the first subframe set, a complementary set of the first subframe set, and a subset of the complementary set of the first subframe set, and a subframe included in the subframe configuration information is used by the served terminal to transmit an uplink signal.

The uplink signal includes at least one of an uplink sounding signal, a preamble, and a sequence code.

When transmitting the uplink signal, the terminal served by the first cell is prevented from using a subframe in the first subframe set. Therefore, it can be ensured that interference to uplink reception by a neighboring cell of the first cell is reduced.

The first uplink information is at least one of the uplink signal, a physical uplink control channel (PUCCH for short), a physical uplink shared channel (PUSCH for short), and a physical random access channel (PRACH for short).

The first subframe set may include a muted subframe of a physical resource block for transmitting the PUCCH or muted subframes of all physical resource blocks.

Optionally, that the first cell notifies subframe configuration information to a terminal served by the first cell may be implemented in the following manner:

The first cell sends a broadcast message to the terminal served by the first cell, where the broadcast message carries the subframe configuration information; or the first cell sends higher layer signaling carrying the subframe configuration information to the terminal served by the first cell. The higher layer signaling may be RRC signaling.

In a possible implementation, the first cell configures a second subframe set used for uplink transmission, where a subframe included in the second subframe set is used for uplink communication in the first cell; and the first cell sends configuration information of the second subframe set to a second cell.

In a scenario of a virtual cell, the first cell is a primary cell, and the second cell is a secondary cell.

In a scenario of a non-virtual cell, the first cell is a macro cell, and the second cell is a micro cell.

For example, the second subframe set may include first N uplink subframes in every M subframes. Both M and N are positive integers, and M≥N.

The primary cell configures, for each secondary cell, a second subframe set used for uplink transmission, so that the secondary cell performs uplink transmission in a subframe in the second subframe set.

Optionally, the configuration information of the second subframe set is used to instruct the second cell to configure, based on the configuration information of the second subframe set, a third subframe set used for uplink transmission.

A subframe included in the third subframe set is used for uplink transmission in the second cell.

The subframe included in the third subframe set is different from the subframe included in the second subframe set.

Optionally, the subframe in the second subframe set is further used for uplink transmission in an uplink HARQ process in the first cell.

For example, for an FDD uplink subframe k+8n, where k∈{0, 1, 2, 3, 4, 5, 6, 7} and n is a positive integer, a subset in every frame or all frames may be reserved for uplink transmission in the uplink HARQ process in the first cell.

Optionally, that the first cell configures a second subframe set used for uplink transmission for the second cell may be implemented in the following manner:

The first cell configures the second subframe set for the second cell based on a radio resource configuration of the first cell and system information.

Optionally, that the first cell configures the second subframe set for the second cell based on a radio resource configuration of the first cell and system information may be implemented in the following manner:

The first cell selects, from subframes scheduled in a scheduling window of a system information block and subframes scheduled for paging detection, uplink subframes used for performing message feedbacks by a terminal, to form the second subframe set.

Optionally, the configuration information of the second subframe set is used to indicate that a terminal served by the second cell needs to be forbidden to perform uplink transmission in the second subframe set when the second cell performs uplink or downlink scheduling.

Specifically, the second cell receives the first subframe set sent by the first cell and used for uplink transmission in the first cell; and the terminal served by the second cell is forbidden to perform uplink transmission in the second subframe set when the second cell performs uplink or downlink scheduling.

Optionally, the configuration information of the second subframe set is used to instruct the second cell to schedule a PDSCH in a preset first subframe, to prevent the terminal served by the secondary cell from performing a HARQ feedback in the second subframe set.

The preset first subframe may be a subframe in the third subframe set.

Therefore, the second cell schedules the PDSCH in the preset first subframe, thereby forbidding the terminal served by the second cell to perform the HARQ feedback in the second subframe set.

The first subframe may be preconfigured based on the second subframe set, and may be specifically a subframe in the third subframe set.

Optionally, the configuration information of the second subframe set is used to instruct the second cell to schedule a PUSCH in a preconfigured second subframe, to prevent the terminal served by the second cell from first sending or retransmitting a data packet in the second subframe set.

The second cell schedules the PUSCH in the preconfigured second subframe, to prevent the terminal served by the second cell from first sending or retransmitting a data packet in the second subframe set.

The second subframe may be preconfigured based on the second subframe set, and may be specifically a subframe in the third subframe set.

Figure 5:
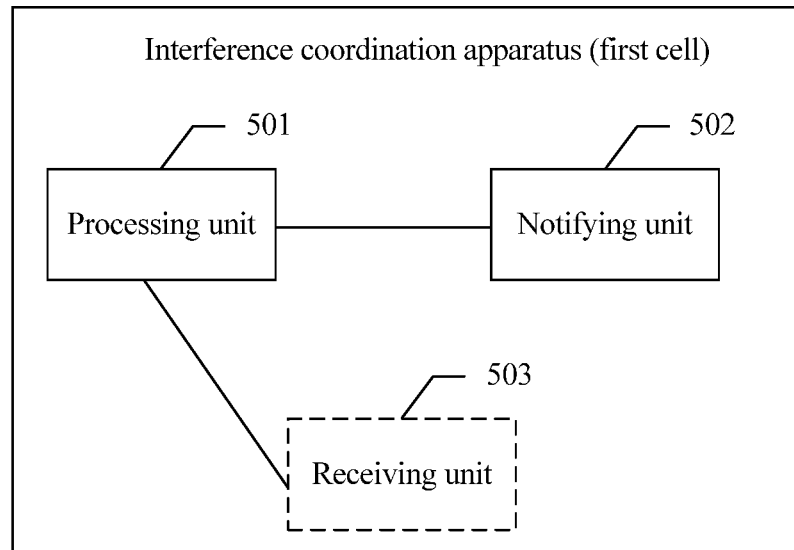
FIG. 5 is a schematic diagram of an interference coordination apparatus applied to a first cell according to an embodiment of this application.

This application further provides an interference coordination apparatus, where the apparatus is applied to a first cell. As shown in FIG. 5, the apparatus includes: a processing unit 501, configured to determine first configuration information of the first cell, where the first configuration information includes a parameter for transmitting uplink control information UCI by a terminal served by the first cell, the parameter included in the first configuration information is a parameter configured for the first cell and is a parameter orthogonal to a parameter configured for a second cell, and the second cell is a neighboring cell of the first cell; and a notifying unit 502, configured to notify the first configuration information determined by the processing unit 501 to the served terminal.

The served terminal is a terminal that is served by the first cell and on which an absolute value of a difference between signal strength received from the first cell and signal strength received from the second cell is less than a preset threshold.

The parameter included in the first configuration information is configured for the served terminal.

The parameter included in the first configuration information includes at least one of a cyclic shift value and an orthogonal sequence code.

Optionally, the processing unit 501 is specifically configured to select, by the first cell, a parameter from a first parameter pool, and generate the first configuration information, where the first parameter pool includes a plurality of parameters preconfigured for the first cell and used for transmitting the UCI by the terminal served by the first cell, and any two parameters are orthogonal to each other.

The first parameter pool includes a plurality of sequence codes and a plurality of cyclic shift values.

Any two sequence codes included in the first parameter pool are orthogonal to each other, or any two cyclic shift values included in the first parameter pool are orthogonal to each other.

The parameters included in the first parameter pool are orthogonal to parameters included in a second parameter pool preconfigured for the second cell.

Optionally, the apparatus may further include a receiving unit 503, configured to: before the processing unit 501 determines the first configuration information of the first cell, receive second configuration information of the second cell notified by the second cell, where the second configuration information includes a parameter preconfigured for the second cell and used for transmitting UCI by a terminal served by the second cell.

Optionally, the processing unit 501 is specifically configured to determine the first configuration information of the first cell based on the second configuration information of the second cell, where the parameter in the first configuration information is orthogonal to the parameter in the second configuration information.

The notifying unit 502 is specifically configured to send the first configuration information to the served terminal by using radio resource control RRC signaling.

Optionally, the first cell is a secondary cell of the served terminal, and the served terminal is further connected to a primary cell; and the notifying unit 502 is specifically configured to instruct the primary cell to send the first configuration information to the served terminal.

Optionally, the first cell is the secondary cell of the served terminal, and the served terminal is further connected to the primary cell; and the notifying unit 502 is further configured to: before the processing unit 501 determines the first configuration information of the first cell, notify third configuration information preconfigured for the first cell to the primary cell, so that the primary cell selects, from at least one UCI parameter included in the third configuration information, a parameter that is orthogonal to a parameter included in received fourth configuration information sent by the second cell, and after generating the first configuration information, sends the first configuration information to the first cell; where the third configuration information includes at least one parameter used for transmitting the UCI by the terminal served by the first cell, and the fourth configuration information includes at least one parameter preconfigured for the second cell and used for transmitting UCI by a terminal served by the second cell.

Optionally, the first cell is the secondary cell of the served terminal, and the served terminal is further connected to the primary cell; and the notifying unit 502 is further configured to: before the processing unit 501 determines the first configuration information of the first cell, notify third configuration information preconfigured for the first cell to the primary cell, so that the primary cell reallocates at least one parameter to the first cell and the second cell separately based on the third configuration information and received fourth configuration information sent by the second cell; where the at least one parameter allocated to the first cell is orthogonal to the at least one parameter allocated to the second cell, the third configuration information includes at least one parameter used for transmitting the UCI by the terminal served by the first cell, and the fourth configuration information includes at least one parameter preconfigured for the second cell and used for transmitting UCI by a terminal served by the second cell.

Optionally, the receiving unit 503 is configured to receive the at least one parameter allocated to the first cell and sent by the primary cell; and the processing unit 501 is specifically configured to select a parameter from the at least one parameter allocated to the first cell, and generate the first configuration information.

Optionally, the first cell is the secondary cell of the served terminal, and the served terminal is further connected to the primary cell; and the notifying unit 502 is further configured to: before the processing unit 501 determines the first configuration information of the first cell, notify third configuration information preconfigured for the first cell to the primary cell, so that the primary cell determines, based on the third configuration information and received fourth configuration information sent by the second cell, a first configuration mode for optimizing the third configuration information by the first cell and a second configuration mode for optimizing the fourth configuration information by the second cell; where at least one parameter included in the third configuration information optimized by the first cell based on the first configuration mode is orthogonal to at least one parameter included in the fourth configuration information optimized by the second cell based on the second configuration mode, the third configuration information includes at least one parameter used for transmitting the UCI by the terminal served by the first cell, and the fourth configuration information includes at least one parameter preconfigured for the second cell and used for transmitting UCI by a terminal served by the second cell.

Optionally, the receiving unit 503 is configured to receive the first configuration mode sent by the primary cell; and the processing unit 501 is specifically configured to optimize the third configuration information based on the first configuration mode, and select a parameter from the at least one parameter included in the optimized third configuration information to generate the first configuration information.

In this embodiment of this application, the unit division is an example and is merely logical function division, and may be other division in an actual implementation. In addition, functional units in each embodiment of this embodiment may be integrated into one processor, or each functional unit may exist independently, or two or more units may be integrated into one unit. The integrated unit may be implemented in a form of hardware, or may be implemented in a form of a software functional module.

Figure 6:
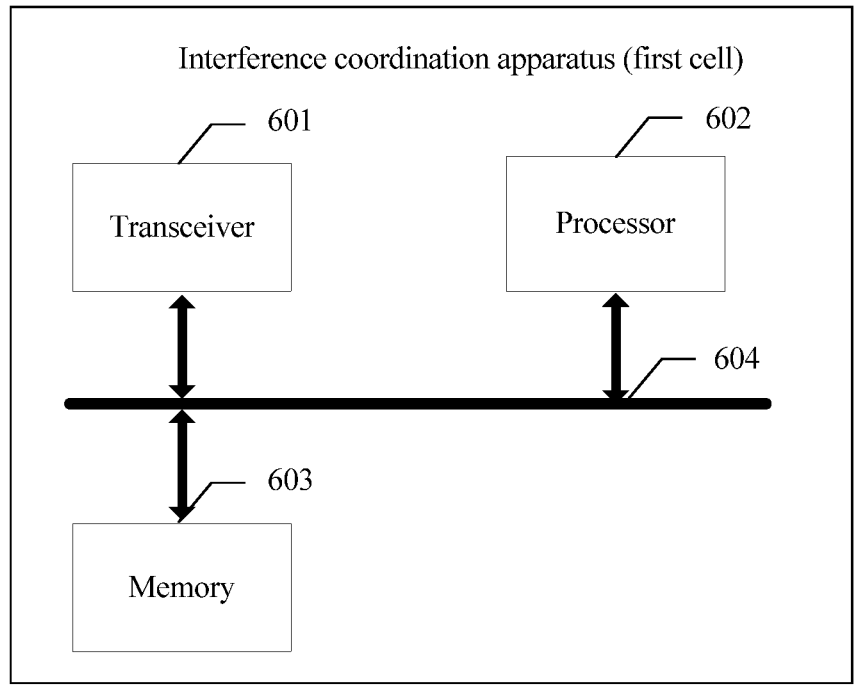
FIG. 6 is a schematic diagram of another interference coordination apparatus applied to a first cell according to an embodiment of this application.

When the integrated unit is implemented in the form of hardware, functions corresponding to the receiving unit 503 and the notifying unit 502 may be implemented by using a transceiver 601, and functions corresponding to the processing unit 501 may be implemented by using a processor 602, as shown in FIG. 6. The apparatus may further include a memory 603.

The memory 603 is configured to store program code executed by the processor 602.

The processor 602 may be a central processing unit (English: central processing unit, CPU for short), a digital processing unit, or the like. The processor 602 receives and sends messages by using the transceiver 601. In this embodiment of this application, a specific connection medium between the transceiver 601, the processor 602, and the memory 603 is not limited. In this embodiment of this application, the memory 603, the processor 602, and the transceiver 601 are connected by a bus 604 in FIG. 6. In FIG. 6, the bus is indicated by a bold line. The foregoing is merely an example for description. Connection modes of other components are not limited thereto. The bus may be categorized as an address bus, a data bus, a control bus, or the like. For ease of indication, the bus is indicated by using only one bold line in FIG. 6. However, it does not indicate that there is only one bus or only one type of bus.

The memory 603 may be a volatile memory, for example, a random access memory (RAM for short); the memory 603 may also be a non-volatile memory, for example, a read-only memory (ROM for short), a flash memory, a hard disk drive (HDD for short), or a solid-state drive (SSD for short); or the memory 603 is any other medium that can be used to carry or store expected program code in a form of an instruction or a data structure and can be accessed by a computer, but is not limited thereto. The memory 603 may be a combination of the foregoing memories.

The processor 602 is configured to determine first configuration information of the first cell, where the first configuration information includes a parameter for transmitting uplink control information UCI by a terminal served by the first cell, the parameter included in the first configuration information is a parameter configured for the first cell and is a parameter orthogonal to a parameter configured for a second cell, and the second cell is a neighboring cell of the first cell.

The transceiver 601 is configured to notify the first configuration information determined by the processor 602 to the served terminal.

The served terminal is a terminal that is served by the first cell and on which an absolute value of a difference between signal strength received from the first cell and signal strength received from the second cell is less than a preset threshold.

The parameter included in the first configuration information is configured for the served terminal.

The parameter included in the first configuration information includes at least one of a cyclic shift value and an orthogonal sequence code.

The processor 602 is specifically configured to select, by the first cell, a parameter from a first parameter pool, and generate the first configuration information, where the first parameter pool includes a plurality of parameters preconfigured for the first cell and used for transmitting the UCI by the terminal served by the first cell, and any two parameters are orthogonal to each other.

The first parameter pool includes a plurality of sequence codes and a plurality of cyclic shift values.

Any two sequence codes included in the first parameter pool are orthogonal to each other, or any two cyclic shift values included in the first parameter pool are orthogonal to each other.

The parameters included in the first parameter pool are orthogonal to parameters included in a second parameter pool preconfigured for the second cell.

The transceiver 601 is further configured to: before the processor 602 determines the first configuration information of the first cell, receive second configuration information of the second cell notified by the second cell, where the second configuration information includes a parameter preconfigured for the second cell and used for transmitting UCI by a terminal served by the second cell. The processor 602 is specifically configured to determine the first configuration information of the first cell based on the second configuration information of the second cell, where the parameter in the first configuration information is orthogonal to the parameter in the second configuration information.

The transceiver 601 is specifically configured to send the first configuration information to the served terminal by using radio resource control RRC signaling.

The first cell is a secondary cell of the served terminal, and the served terminal is further connected to a primary cell; and the transceiver 601 is specifically configured to instruct the primary cell to send the first configuration information to the served terminal.

The first cell is the secondary cell of the served terminal, and the served terminal is further connected to the primary cell; and the transceiver 601 is further configured to: before the processor 602 determines the first configuration information of the first cell, notify third configuration information preconfigured for the first cell to the primary cell, so that the primary cell selects, from at least one UCI parameter included in the third configuration information, a parameter that is orthogonal to a parameter included in received fourth configuration information sent by the second cell, and after generating the first configuration information, sends the first configuration information to the first cell; where the third configuration information includes at least one parameter used for transmitting the UCI by the terminal served by the first cell, and the fourth configuration information includes at least one parameter preconfigured for the second cell and used for transmitting UCI by a terminal served by the second cell.

The first cell is the secondary cell of the served terminal, and the served terminal is further connected to the primary cell; and the transceiver 601 is further configured to: before the processor 602 determines the first configuration information of the first cell, notify third configuration information preconfigured for the first cell to the primary cell, so that the primary cell reallocates at least one parameter to the first cell and the second cell separately based on the third configuration information and received fourth configuration information sent by the second cell; where the at least one parameter allocated to the first cell is orthogonal to the at least one parameter allocated to the second cell, the third configuration information includes at least one parameter used for transmitting the UCI by the terminal served by the first cell, and the fourth configuration information includes at least one parameter preconfigured for the second cell and used for transmitting UCI by a terminal served by the second cell.

The transceiver 601 is further configured to receive the at least one parameter allocated to the first cell and sent by the primary cell; and the processor 602 is specifically configured to select a parameter from the at least one parameter allocated to the first cell, and generate the first configuration information.

The first cell is the secondary cell of the served terminal, and the served terminal is further connected to the primary cell; and the transceiver 601 is further configured to: before the processor 602 determines the first configuration information of the first cell, notify third configuration information preconfigured for the first cell to the primary cell, so that the primary cell determines, based on the third configuration information and received fourth configuration information sent by the second cell, a first configuration mode for optimizing the third configuration information by the first cell and a second configuration mode for optimizing the fourth configuration information by the second cell; where at least one parameter included in the third configuration information optimized by the first cell based on the first configuration mode is orthogonal to at least one parameter included in the fourth configuration information optimized by the second cell based on the second configuration mode, the third configuration information includes at least one parameter used for transmitting the UCI by the terminal served by the first cell, and the fourth configuration information includes at least one parameter preconfigured for the second cell and used for transmitting UCI by a terminal served by the second cell.

The transceiver 601 is further configured to receive the first configuration mode sent by the primary cell; and the processor 602 is specifically configured to optimize the third configuration information based on the first configuration mode, and select a parameter from the at least one parameter included in the optimized third configuration information to generate the first configuration information.

Figure 7:
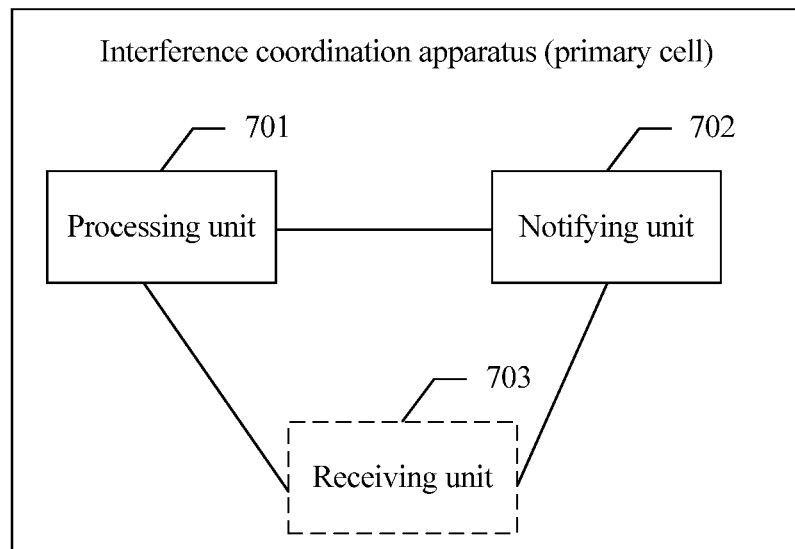
FIG. 7 is a schematic diagram of an interference coordination apparatus applied to a primary cell according to an embodiment of this application.

An embodiment of this application provides an interference coordination apparatus, where the apparatus is applied to a primary cell. As shown in FIG. 7, the apparatus includes: a processing unit 701, configured to determine first configuration information of a secondary cell, where a terminal of dual connectivity is connected to the primary cell and the secondary cell separately, the first configuration information includes a parameter used for transmitting uplink control information UCI by the terminal of dual connectivity, and a parameter included in the first configuration information is a parameter allocated to the secondary cell and is a parameter orthogonal to a parameter allocated to a neighboring cell of the secondary cell; and a notifying unit 702, configured to notify the first configuration information to the terminal of dual connectivity.

Optionally, the terminal of dual connectivity is located in an overlapping area between the secondary cell and the neighboring cell of the secondary cell.

Optionally, the first configuration information includes at least one of a cyclic shift value and an orthogonal sequence code.

Optionally, the first configuration information is configured for the terminal of dual connectivity.

Optionally, the apparatus further includes a receiving unit 703, configured to: before the processing unit 701 determines the first configuration information of the secondary cell, receive second configuration information sent by the secondary cell, and receive third configuration information sent by the neighboring cell, where the second configuration information includes at least one parameter used for transmitting UCI by a terminal served by the secondary cell, and the third configuration information includes at least one parameter used for transmitting UCI by a terminal served by the neighboring cell.

Optionally, the processing unit 701 is specifically configured to determine the first configuration information based on the second configuration information and the third configuration information.

Optionally, the processing unit 701 is specifically configured to select, from the at least one parameter included in the second configuration information, a parameter that is orthogonal to a parameter included in the third configuration information, and generate the first configuration information.

Optionally, the processing unit 701 is further configured to: after the receiving unit 703 receives the second configuration information sent by the secondary cell and receives the third configuration information sent by the neighboring cell, and before determining the first configuration information of the secondary cell, allocate at least one parameter to the secondary cell and the neighboring cell separately based on the second configuration information and the third configuration information, and notify the secondary cell and the neighboring cell, where the at least one parameter allocated to the secondary cell is orthogonal to the at least one parameter allocated to the neighboring cell.

Optionally, the receiving unit 703 is further configured to receive the first configuration information sent by the secondary cell, where the first configuration information is generated based on a parameter that is selected from the at least one UCI parameter allocated to the secondary cell and used for sending the UCI by the terminal of dual connectivity after the secondary cell receives the at least one parameter allocated to the secondary cell and sent by the primary cell.

Optionally, the processing unit 701 is further configured to: after the receiving unit 703 receives the second configuration information sent by the secondary cell and receives the third configuration information sent by the neighboring cell, and before determining the first configuration information of the secondary cell, determine, based on the second configuration information and the third configuration information, a first configuration mode for optimizing the second configuration information by the secondary cell and a second configuration mode for optimizing the third configuration information by the neighboring cell; and the notifying unit 702 is further configured to send the first configuration mode to the secondary cell and send the second configuration mode to the neighboring cell; where at least one parameter included in the second configuration information optimized by the secondary cell based on the first configuration mode is orthogonal to at least one parameter included in the third configuration information optimized by the neighboring cell based on the second configuration mode.

Optionally, the receiving unit 703 is further configured to receive the first configuration information sent by the secondary cell, where the first configuration information is generated based on a parameter that is selected from the at least one parameter included in the optimized second configuration information and used for transmitting the UCI by the terminal of dual connectivity after the secondary cell optimizes the second configuration information based on the first configuration mode.

Optionally, the notifying unit 702 is specifically configured to send the first configuration information to the terminal of dual connectivity by using RRC signaling.

Optionally, the notifying unit 702 is specifically configured to send a notification message to the terminal of dual connectivity, where the notification message is used to instruct the terminal of dual connectivity to obtain the first configuration information from the secondary cell.

In this embodiment of this application, the unit division is an example and is merely logical function division, and may be other division in an actual implementation. In addition, functional units in each embodiment of this embodiment may be integrated into one processor, or each functional unit may exist independently, or two or more units may be integrated into one unit. The integrated unit may be implemented in a form of hardware, or may be implemented in a form of a software functional module.

Figure 8:
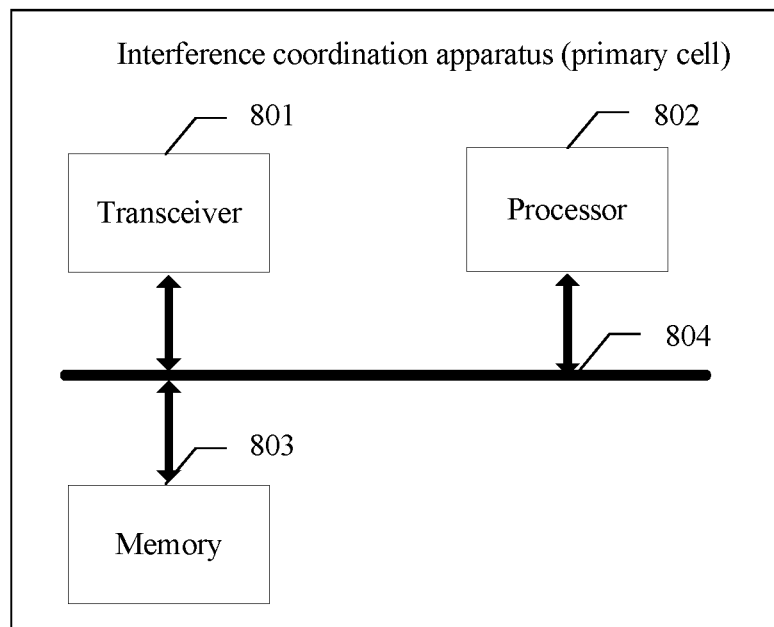
FIG. 8 is a schematic diagram of another interference coordination apparatus applied to a primary cell according to an embodiment of this application.

When the integrated unit is implemented in the form of hardware, functions corresponding to the receiving unit 703 and the notifying unit 702 may be implemented by using a transceiver 801, and functions corresponding to the processing unit 701 may be implemented by using a processor 802, as shown in FIG. 8. The apparatus may further include a memory 803.

The memory 803 is configured to store program code executed by the processor 802.

The processor 802 may be a central processing unit (English: central processing unit, CPU for short), a digital processing unit, or the like. The processor 802 receives and sends messages by using the transceiver 801. In this embodiment of this application, a specific connection medium between the transceiver 801, the processor 802, and the memory 803 is not limited. In this embodiment of this application, the memory 803, the processor 802, and the transceiver 801 are connected by a bus 804 in FIG. 8. In FIG. 8, the bus is indicated by a bold line. The foregoing is merely an example for description. Connection modes of other components are not limited thereto. The bus may be categorized as an address bus, a data bus, a control bus, or the like. For ease of indication, the bus is indicated by using only one bold line in FIG. 8. However, it does not indicate that there is only one bus or only one type of bus.

The memory 803 may be a volatile memory, for example, a RAM; the memory 803 may also be a non-volatile memory, for example, a ROM, a flash memory, an HDD, or an SSD; or the memory 803 is any other medium that can be used to carry or store expected program code in a form of an instruction or a data structure and can be accessed by a computer, but is not limited thereto. The memory 803 may be a combination of the foregoing memories.

The processor 802 is configured to determine first configuration information of a secondary cell, where a terminal of dual connectivity is connected to the primary cell and the secondary cell separately, and a parameter included in the first configuration information is a parameter allocated to the secondary cell and is a parameter orthogonal to a parameter allocated to a neighboring cell of the secondary cell.

The transceiver 801 is configured to notify the first configuration information to the terminal of dual connectivity.

The parameter included in the first configuration information is used for transmitting uplink control information UCI by the terminal of dual connectivity.

The terminal of dual connectivity is located in an overlapping area between the secondary cell and the neighboring cell of the secondary cell.

The first configuration information includes at least one of a cyclic shift value and an orthogonal sequence code.

The first configuration information is configured for the terminal of dual connectivity.

The transceiver 801 is further configured to: before the processor 802 determines the first configuration information of the secondary cell, receive second configuration information sent by the secondary cell, and receive third configuration information sent by the neighboring cell, where the second configuration information includes at least one parameter used for transmitting UCI by a terminal served by the secondary cell, and the third configuration information includes at least one parameter used for transmitting UCI by a terminal served by the neighboring cell.

The processor 802 is specifically configured to determine the first configuration information based on the second configuration information and the third configuration information.

The processor 802 is specifically configured to select, from the at least one parameter included in the second configuration information, a parameter that is orthogonal to a parameter included in the third configuration information, and generate the first configuration information.

The processor 802 is further configured to: after the transceiver 801 receives the second configuration information sent by the secondary cell and receives the third configuration information sent by the neighboring cell, and before determining the first configuration information of the secondary cell, allocate at least one parameter to the secondary cell and the neighboring cell separately based on the second configuration information and the third configuration information, and notify the secondary cell and the neighboring cell, where the at least one parameter allocated to the secondary cell is orthogonal to the at least one parameter allocated to the neighboring cell.

Based on the foregoing design, the transceiver 801 is further configured to receive the first configuration information sent by the secondary cell, where the first configuration information is generated based on a parameter that is selected from the at least one UCI parameter allocated to the secondary cell and used for sending the UCI by the terminal of dual connectivity after the secondary cell receives the at least one parameter allocated to the secondary cell and sent by the primary cell.

The processor 802 is further configured to: after the transceiver 801 receives the second configuration information sent by the secondary cell and receives the third configuration information sent by the neighboring cell, and before determining the first configuration information of the secondary cell, determine, based on the second configuration information and the third configuration information, a first configuration mode for optimizing the second configuration information by the secondary cell and a second configuration mode for optimizing the third configuration information by the neighboring cell; and the transceiver 801 is further configured to send the first configuration mode to the secondary cell and send the second configuration mode to the neighboring cell; where at least one parameter included in the second configuration information optimized by the secondary cell based on the first configuration mode is orthogonal to at least one parameter included in the third configuration information optimized by the neighboring cell based on the second configuration mode.

The transceiver 801 is further configured to receive the first configuration information sent by the secondary cell, where the first configuration information is generated based on a parameter that is selected from the at least one parameter included in the optimized second configuration information and used for transmitting the UCI by the terminal of dual connectivity after the secondary cell optimizes the second configuration information based on the first configuration mode.

The transceiver 801 is specifically configured to send the first configuration information to the terminal of dual connectivity by using RRC signaling.

The transceiver 801 is specifically configured to send a notification message to the terminal of dual connectivity, where the notification message is used to instruct the terminal of dual connectivity to obtain the first configuration information from the secondary cell.

Figure 9:
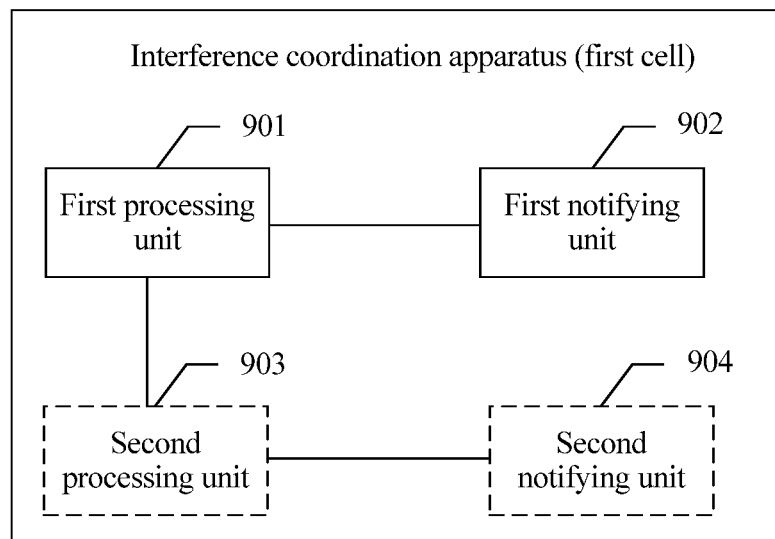
FIG. 9 is a schematic diagram of still another interference coordination apparatus applied to a first cell according to an embodiment of this application.

An embodiment of this application provides an interference coordination apparatus, where the apparatus is applied to a first cell. As shown in FIG. 9, the apparatus includes: a first processing unit 901, configured to configure a first subframe set for first uplink information; and a first notifying unit 902, configured to notify subframe configuration information to a terminal served by the first cell, where the subframe configuration information includes at least one of the following: the first subframe set, a subset of the first subframe set, a complementary set of the first subframe set, and a subset of the complementary set of the first subframe set, and a subframe included in the subframe configuration information is used by the served terminal to transmit an uplink signal.

Optionally, the uplink signal includes at least one of an uplink sounding signal, a preamble, and a sequence code.

Optionally, the first uplink information is at least one of the uplink signal, a physical uplink control channel PUCCH, a physical uplink shared channel PUSCH, and a physical random access channel PRACH.

Optionally, the first subframe set includes a muted subframe of a physical resource block for transmitting the PUCCH or muted subframes of all physical resource blocks.

Optionally, the first notifying unit 902 is specifically configured to: send a broadcast message to the terminal served by the first cell, where the broadcast message carries the subframe configuration information; or send RRC signaling carrying the subframe configuration information to the terminal served by the first cell.

Optionally, the apparatus further includes: a second processing unit 903, configured to configure a second subframe set used for uplink transmission, where a subframe included in the second subframe set is used for uplink communication in the first cell; and a second notifying unit 904, configured to send configuration information of the second subframe set to a second cell.

Optionally, the first cell is a primary cell, and the second cell is a secondary cell; or the first cell is a macro cell, or the first cell is a micro cell.

Optionally, the configuration information of the second subframe set is used to instruct the second cell to configure, based on the configuration information of the second subframe set, a third subframe set used for uplink transmission.

Optionally, a subframe included in the third subframe set is used for uplink transmission in the second cell.

Optionally, the subframe included in the third subframe set is different from the subframe included in the second subframe set.

Optionally, the subframe in the second subframe set is further used for uplink transmission in an uplink hybrid automatic repeat request HARQ process in the first cell.

Optionally, the second processing unit 903 is specifically configured to configure the second subframe set for the second cell based on a radio resource configuration of the first cell and system information.

Optionally, the second processing unit 903 is specifically configured to select, from subframes scheduled in a scheduling window of a system information block and subframes scheduled for paging detection, uplink subframes used for performing message feedbacks by a terminal, to form the subframe set.

Optionally, the configuration information of the second subframe set is used to indicate that a terminal served by the second cell needs to be forbidden to perform uplink transmission in the second subframe set when the second cell performs uplink or downlink scheduling.

Optionally, the configuration information of the second subframe set is used to instruct the second cell to schedule a physical downlink shared channel PDSCH in a preset first subframe, to prevent the terminal served by the secondary cell from performing a hybrid automatic repeat request HARQ feedback in the second subframe set.

Optionally, the configuration information of the second subframe set is used to instruct the second cell to schedule a physical uplink shared channel PUSCH in a preconfigured second subframe, to prevent the terminal served by the second cell from first sending or retransmitting a data packet in the second subframe set.

In this embodiment of this application, the unit division is an example and is merely logical function division, and may be other division in an actual implementation. In addition, functional units in each embodiment of this embodiment may be integrated into one processor, or each functional unit may exist independently, or two or more units may be integrated into one unit. The integrated unit may be implemented in a form of hardware, or may be implemented in a form of a software functional module.

Figure 10:
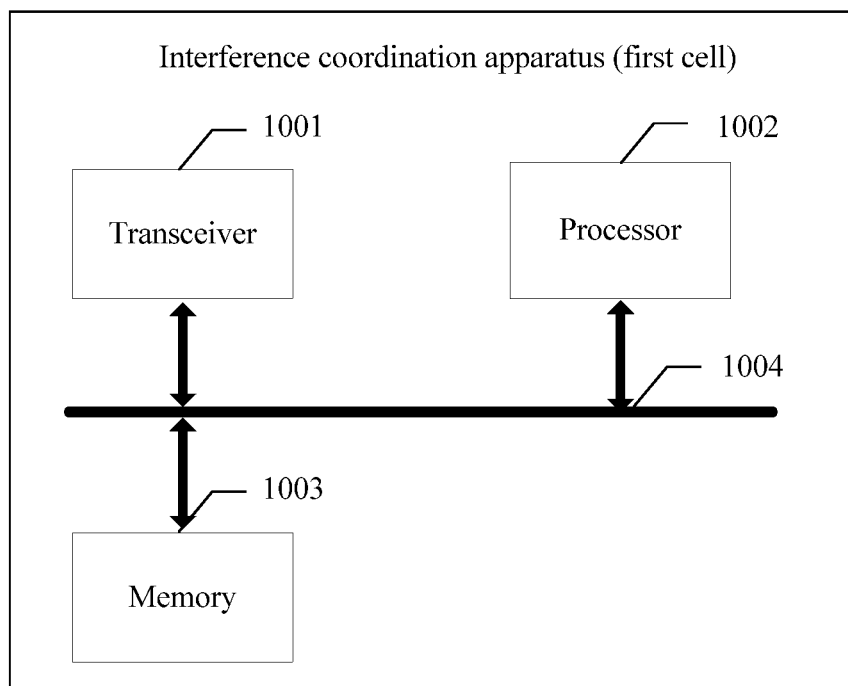
FIG. 10 is a schematic diagram of yet another interference coordination apparatus applied to a first cell according to an embodiment of this application.

When the integrated unit is implemented in the form of hardware, functions corresponding to the first notifying unit 902 and the second notifying unit 904 may be implemented by using a transceiver 1001, and functions corresponding to the first processing unit 901 and the second processing unit 903 may be implemented by using a processor 1002, as shown in FIG. 10. The apparatus may further include a memory 1003.

The memory 1003 is configured to store program code executed by the processor 1002.

The processor 1002 may be a central processing unit (CPU for short), a digital processing unit, or the like. The processor 1002 receives and sends messages by using the transceiver 1001. In this embodiment of this application, a specific connection medium between the transceiver 1001, the processor 1002, and the memory 1003 is not limited. In this embodiment of this application, the memory 1003, the processor 1002, and the transceiver 1001 are connected by a bus 1004 in FIG. 10. In FIG. 10, the bus is indicated by a bold line. The foregoing is merely an example for description. Connection modes of other components are not limited thereto. The bus may be categorized as an address bus, a data bus, a control bus, or the like. For ease of indication, the bus is indicated by using only one bold line in FIG. 10. However, it does not indicate that there is only one bus or only one type of bus.

The memory 1003 may be a volatile memory, for example, a RAM; the memory 1003 may also be a non-volatile memory, for example, a ROM, a flash memory, an HDD, or an SSD; or the memory 1003 is any other medium that can be used to carry or store expected program code in a form of an instruction or a data structure and can be accessed by a computer, but is not limited thereto. The memory 1003 may be a combination of the foregoing memories.

The processor 1002 is configured to configure a first subframe set for first uplink information.

The transceiver 1001 is configured to notify subframe configuration information to a terminal served by the first cell.

The subframe configuration information includes at least one of the following: the first subframe set, a subset of the first subframe set, a complementary set of the first subframe set, and a subset of the complementary set of the first subframe set, and a subframe included in the subframe configuration information is used by the served terminal to transmit an uplink signal.

The uplink signal includes at least one of an uplink sounding signal, a preamble, and a sequence code.

The first uplink information is at least one of the uplink signal, a physical uplink control channel PUCCH, a physical uplink shared channel PUSCH, and a physical random access channel PRACH.

The first subframe set includes a muted subframe of a physical resource block for transmitting the PUCCH or muted subframes of all physical resource blocks.

The transceiver 1001 is specifically configured to: send a broadcast message to the terminal served by the first cell, where the broadcast message carries the subframe configuration information; or send RRC signaling carrying the subframe configuration information to the terminal served by the first cell.

The processor 1002 is further configured to configure a second subframe set used for uplink transmission, where a subframe included in the second subframe set is used for uplink communication in the first cell; and the transceiver 1001 is further configured to send configuration information of the second subframe set to a second cell.

The first cell is a primary cell, and the second cell is a secondary cell; or the first cell is a macro cell, and the second cell is a micro cell.

The configuration information of the second subframe set is used to instruct the second cell to configure, based on the configuration information of the second subframe set, a third subframe set used for uplink transmission.

A subframe included in the third subframe set is used for uplink transmission in the second cell.

The subframe included in the third subframe set is different from the subframe included in the second subframe set.

The subframe in the second subframe set is further used for uplink transmission in an uplink hybrid automatic repeat request HARQ process in the first cell.

The processor 1002 is specifically configured to configure the second subframe set for the second cell based on a radio resource configuration of the first cell and system information.

The processor 1002 is specifically configured to select, from subframes scheduled in a scheduling window of a system information block and subframes scheduled for paging detection, uplink subframes used for performing message feedbacks by a terminal, to form the subframe set.

The configuration information of the second subframe set is used to indicate that a terminal served by the second cell needs to be forbidden to perform uplink transmission in the second subframe set when the second cell performs uplink or downlink scheduling.

The configuration information of the second subframe set is used to instruct the second cell to schedule a physical downlink shared channel PDSCH in a preset first subframe, to prevent the terminal served by the secondary cell from performing a hybrid automatic repeat request HARQ feedback in the second subframe set.

The configuration information of the second subframe set is used to instruct the second cell to schedule a physical uplink shared channel PUSCH in a preconfigured second subframe, to prevent the terminal served by the second cell from first sending or retransmitting a data packet in the second subframe set.

Figure 11:
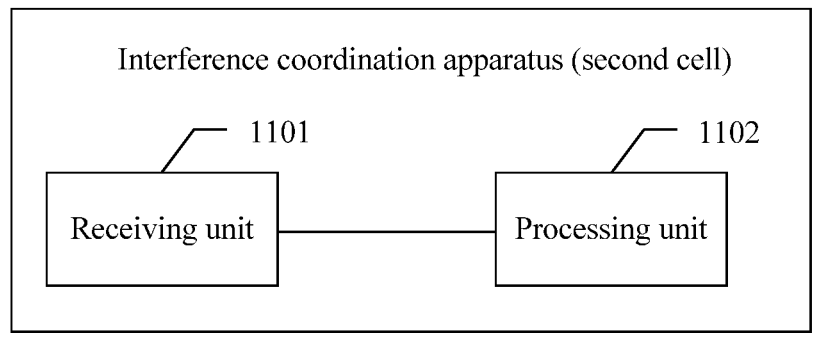
FIG. 11 is a schematic diagram of an interference coordination apparatus applied to a second cell according to an embodiment of this application.

An embodiment of this application provides an interference coordination apparatus, where the apparatus is applied to a second cell. As shown in FIG. 11, the apparatus includes: a receiving unit 1101, configured to receive a first subframe set sent by the first cell and used for uplink transmission in the first cell; and a processing unit 1102, configured to configure, based on the first subframe set, a second subframe set used for uplink transmission.

Optionally, the first cell is a primary cell, and the second cell is a secondary cell; or the first cell is a macro cell, and the second cell is a micro cell.

Optionally, a subframe included in the second subframe set is different from a subframe included in the first subframe set.

Optionally, the subframe included in the second subframe set is used for uplink transmission in the second cell.

Optionally, when performing uplink or downlink scheduling, the processing unit 1102 is further configured to prevent a terminal served by the second cell from performing uplink transmission in the first subframe set.

Optionally, the processing unit 1102 is specifically configured to schedule a physical downlink shared channel PDSCH in a subframe included in the second subframe set, thereby forbidding the terminal served by the secondary cell to perform a hybrid automatic repeat request HARQ feedback in the first subframe set.

Optionally, the processing unit 1102 is specifically configured to schedule a physical uplink shared channel PUSCH in a subframe included in the second subframe set, thereby preventing the terminal served by the second cell from first sending or retransmitting a data packet in the first subframe set.

In this embodiment of this application, the unit division is an example and is merely logical function division, and may be other division in an actual implementation. In addition, functional units in each embodiment of this embodiment may be integrated into one processor, or each functional unit may exist independently, or two or more units may be integrated into one unit. The integrated unit may be implemented in a form of hardware, or may be implemented in a form of a software functional module.

Figure 12:
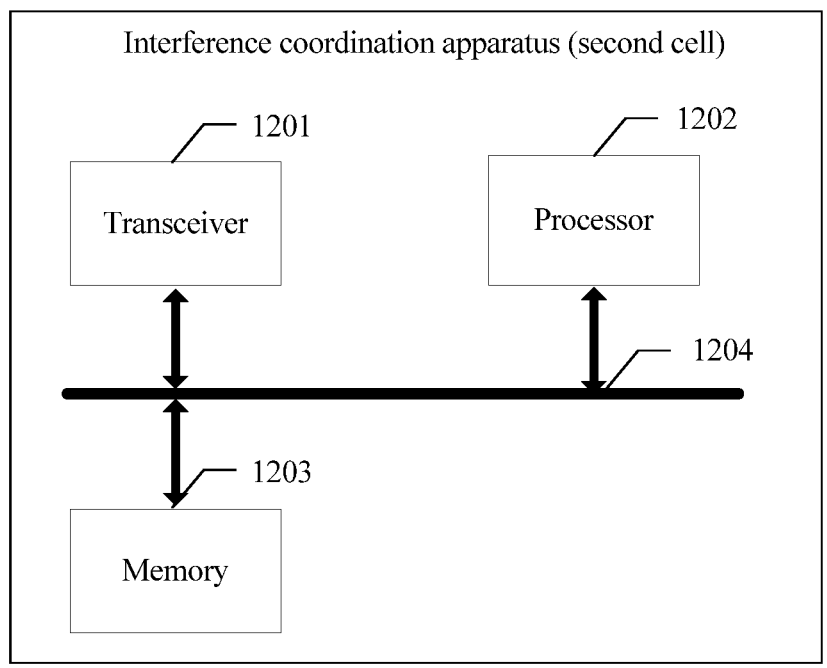
FIG. 12 is a schematic diagram of another interference coordination apparatus applied to a second cell according to an embodiment of this application.

When the integrated unit is implemented in the form of hardware, functions corresponding to the receiving unit 1101 may be implemented by using a transceiver 1201, and functions corresponding to the processing unit 1102 may be implemented by using a processor 1202, as shown in FIG. 12. The apparatus may further include a memory 1203.

The memory 1203 is configured to store program code executed by the processor 1202.

The processor 1202 may be a central processing unit (CPU for short), a digital processing unit, or the like. The processor 1202 receives and sends messages by using the transceiver 1201. In this embodiment of this application, a specific connection medium between the transceiver 1201, the processor 1202, and the memory 1203 is not limited. In this embodiment of this application, the memory 1203, the processor 1202, and the transceiver 1201 are connected by a bus 1204 in FIG. 12. In FIG. 12, the bus is indicated by a bold line. The foregoing is merely an example for description. Connection modes of other components are not limited thereto. The bus may be categorized as an address bus, a data bus, a control bus, or the like. For ease of indication, the bus is indicated by using only one bold line in FIG. 12. However, it does not indicate that there is only one bus or only one type of bus.

The memory 1203 may be a volatile memory, for example, a RAM; the memory 1203 may also be a nonvolatile memory, for example, a ROM, a flash memory, an HDD, or an SSD; or the memory 1203 is any other medium that can be used to carry or store expected program code in a form of an instruction or a data structure and can be accessed by a computer, but is not limited thereto. The memory 1203 may be a combination of the foregoing memories.

The transceiver 1201 is configured to receive a first subframe set sent by the first cell and used for uplink transmission in the first cell.

The processor 1202 is configured to configure, based on the first subframe set, a second subframe set used for uplink transmission.

The first cell is a primary cell, and the second cell is a secondary cell; or the first cell is a macro cell, and the second cell is a micro cell.

A subframe included in the second subframe set is different from a subframe included in the first subframe set.

The subframe included in the second subframe set is used for uplink transmission in the second cell.

When performing uplink or downlink scheduling, the processor 1202 is further configured to forbid a terminal served by the second cell to perform uplink transmission in the first subframe set.

The processor 1202 is specifically configured to schedule a physical downlink shared channel PDSCH in a subframe included in the second subframe set, thereby forbidding the terminal served by the secondary cell to perform a hybrid automatic repeat request HARQ feedback in the first subframe set.

The processor 1202 is specifically configured to schedule a physical uplink shared channel PUSCH in a subframe included in the second subframe set, thereby preventing the terminal served by the second cell from first sending or retransmitting a data packet in the first subframe set.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A method, comprising:
   determining, by a first cell, that an absolute value of a difference between signal strength received from the first cell and signal strength received from a second cell is less than a preset threshold;
   configuring, by the first cell, a first subframe set for first uplink information in response to determining that the absolute value of the difference between signal strength received from the first cell and signal strength received from the second cell is less than the preset threshold; and
   notifying, by the first cell, subframe configuration information to a terminal served by the first cell, wherein the subframe configuration information comprises the first subframe set, a subset of the first subframe set, a complementary set of the first subframe set, or a subset of the complementary set of the first subframe set, and wherein a subframe comprised in the subframe configuration information is used by the served terminal to transmit an uplink signal.

2. The method according to claim 1, wherein the uplink signal comprises an uplink sounding signal, a preamble, or a sequence code.

3. The method according to claim 1, wherein the first uplink information is the uplink signal, a physical uplink control channel (PUCCH), a physical uplink shared channel PUSCH, or a physical random access channel (PRACH).

4. The method according to claim 1, wherein notifying, by the first cell, the subframe configuration information to the terminal served by the first cell comprises:
   sending, by the first cell, a broadcast message to the terminal served by the first cell, wherein the broadcast message carries the subframe configuration information.

5. The method according to claim 1, wherein notifying, by the first cell, the subframe configuration information to the terminal served by the first cell comprises:
   sending, by the first cell, radio resource control (RRC) signaling carrying the subframe configuration information to the terminal served by the first cell.

6. The method according to claim 1, further comprising:
   configuring, by the first cell, a second subframe set for uplink transmission, wherein a subframe comprised in the second subframe set is used for uplink transmission in the first cell; and
   sending, by the first cell, configuration information of the second subframe set to a second cell.

7. The method according to claim 6, wherein the configuration information of the second subframe set is used to instruct the second cell to configure, based on the configuration information of the second subframe set, a third subframe set allocated for uplink transmission.

8. An apparatus, comprising:
   a processor;
   a transceiver; and
   a non-transitory computer-readable storage medium storing a program to be executed by the processor, the program including instructions for:
      determining, by a first cell, that an absolute value of a difference between signal strength received from the first cell and signal strength received from a second cell is less than a preset threshold;
      configuring a first subframe set for first uplink information in response to determining that the absolute value of the difference between signal strength received from the first cell and signal strength received from the second cell is less than the preset threshold; and
      notifying subframe configuration information to a terminal served by the first cell, wherein the apparatus is applied in the first cell, the subframe configuration information comprises the first subframe set, a subset of the first subframe set, a complementary set of the first subframe set, or a subset of the complementary set of the first subframe set, and wherein a subframe comprised in the subframe configuration information is used by the served terminal to transmit an uplink signal.

9. The apparatus according to claim 8, wherein the uplink signal comprises an uplink sounding signal, a preamble, or a sequence code.

10. The apparatus according to claim 8, wherein the first uplink information is the uplink signal, a physical uplink control channel (PUCCH), a physical uplink shared channel (PUSCH), or a physical random access channel (PRACH).

11. The apparatus according to claim 8, wherein the first subframe set comprises a muted subframe of a physical resource block for transmitting a physical uplink control channel (PUCCH) or muted subframes of all physical resource blocks.

12. The apparatus according to claim 8, wherein the instructions further cause the transceiver to:
send a broadcast message to the terminal served by the first cell, wherein the broadcast message carries the subframe configuration information.

13. The apparatus according to claim 8, wherein the instructions further cause the transceiver to:
send radio resource control (RRC) signaling carrying the subframe configuration information to the terminal served by the first cell.

14. The apparatus according to claim 8, wherein the instructions further cause the processor to:
configure a second subframe set for uplink transmission, wherein a subframe comprised in the second subframe set is allocated for uplink communication in the first cell; and
send configuration information of the second subframe set to a second cell.

15. The apparatus according to claim 14, wherein the configuration information of the second subframe set is used to instruct the second cell to configure, based on the configuration information of the second subframe set, a third subframe set allocated for uplink transmission.

16. A non-transitory computer-readable storage medium storing a program to be executed by a processor, the program including instructions for:
determining, by a first cell, that an absolute value of a difference between signal strength received from the first cell and signal strength received from a second cell is less than a preset threshold;
configuring, by the first cell, a first subframe set for first uplink information in response to determining that the absolute value of the difference between signal strength received from the first cell and signal strength received from the second cell is less than the preset threshold; and
notifying subframe configuration information to a terminal served by the first cell, by the first cell, the subframe configuration information comprises the first subframe set, a subset of the first subframe set, a complementary set of the first subframe set, or a subset of the complementary set of the first subframe set, and wherein a subframe comprised in the subframe configuration information is used by the served terminal to transmit an uplink signal.

17. The non-transitory computer-readable storage medium according to claim 16, wherein the uplink signal comprises an uplink sounding signal, a preamble, or a sequence code.

18. The non-transitory computer-readable storage medium according to claim 16, wherein the first uplink information is the uplink signal, a physical uplink control channel (PUCCH), a physical uplink shared channel (PUSCH), or a physical random access channel (PRACH).

19. The non-transitory computer-readable storage medium according to claim 16, wherein the first subframe set comprises a muted subframe of a physical resource block for transmitting a physical uplink control channel (PUCCH) or muted subframes of all physical resource blocks.

20. The non-transitory computer-readable storage medium according to claim 16, wherein the instructions further include instructions to:
send a broadcast message to the terminal served by the first cell, wherein the broadcast message carries the subframe configuration information.

\* \* \* \* \*